US008335227B2

(12) United States Patent
Jabri et al.

(10) Patent No.: US 8,335,227 B2
(45) Date of Patent: Dec. 18, 2012

(54) FAST SESSION SETUP EXTENSIONS TO H.324

(75) Inventors: Marwan A. Jabri, Tiburon, CA (US); Albert C. Wong, Rohnert Park, CA (US); Brody Kenrick, San Francisco, CA (US); Robert Jongbloed, Rozelle (AU); David Jack, Berkshire (GB)

(73) Assignee: Onmobile Global Limited (IN)

( * ) Notice: Subject to any disclaimer, the term of this patent is extended or adjusted under 35 U.S.C. 154(b) by 436 days.

(21) Appl. No.: 12/799,589

(22) Filed: Apr. 26, 2010

(65) Prior Publication Data

US 2010/0277562 A1 Nov. 4, 2010

Related U.S. Application Data

(63) Continuation of application No. 11/303,858, filed on Dec. 15, 2005, now Pat. No. 7,706,319.

(60) Provisional application No. 60/636,638, filed on Dec. 15, 2004.

(51) Int. Cl.
*H04L 12/28* (2006.01)

(52) U.S. Cl. .................................................. 370/431

(58) Field of Classification Search .................. 370/229, 370/235, 238, 351, 389, 395.1, 395.2, 395.21, 370/431
See application file for complete search history.

(56) References Cited

U.S. PATENT DOCUMENTS

| 4,654,866 | A * | 3/1987 | Bottle et al. ............... 348/14.11 |
| 6,320,847 | B1 * | 11/2001 | Agrawal et al. ............... 370/238 |
| 6,377,818 | B2 | 4/2002 | Irube et al. |
| 6,396,837 | B1 * | 5/2002 | Wang et al. ............... 370/395.21 |
| 6,490,275 | B1 * | 12/2002 | Sengodan ............... 370/356 |
| 7,123,920 | B1 * | 10/2006 | Faccin et al. ............... 455/450 |
| 7,139,279 | B2 | 11/2006 | Jabri et al. |

(Continued)

FOREIGN PATENT DOCUMENTS

JP 10-136061 5/1998

(Continued)

OTHER PUBLICATIONS

Nokia, Packet Video, "Fast Media: An enhancement to H.324 call set up", Document Q1-E04, ITU Telecommunication Standardization Sector, Study Group 16, Q.1/16 Rapporteur Meeting, Geneva, Switzerland (Nov. 30-Dec. 2, 2005), 1 page.

(Continued)

*Primary Examiner* — Chi Pham
*Assistant Examiner* — Robert Lopata
(74) *Attorney, Agent, or Firm* — Hoffmann & Baron, LLP

(57) ABSTRACT

A multimedia device configured to support video in a session of a call includes one or more media providing devices and one or more computer codes directed to performing an initialization process for the one or more media providing devices. The initialization process may be performed at an initialization time prior to or substantially equal to a first time prior to or substantially equal to a reception time associated with receiving an indication of call acceptance from a called device, or second time prior to or substantially equal to an acceptance time associated with call acceptance by the multimedia device. The multimedia device also includes one or more computer codes directed to transmitting one or more preferences for the session according to a session setup procedure, one or more media processors coupled to the one or more media providing devices, and one or more computer codes directed to transmitting media on one or more media channels associated with the session.

25 Claims, 7 Drawing Sheets

U.S. PATENT DOCUMENTS

| | | | |
|---|---|---|---|
| 7,526,763 B2* | 4/2009 | Kim | 717/172 |
| 7,680,143 B2 | 3/2010 | Jabri et al. | |
| 7,706,319 B2 | 4/2010 | Jabri et al. | |
| 2003/0041108 A1* | 2/2003 | Henrick et al. | 709/205 |
| 2004/0174817 A1 | 9/2004 | Jabri et al. | |
| 2005/0141511 A1* | 6/2005 | Gopal | 370/395.2 |
| 2006/0056416 A1* | 3/2006 | Yang et al. | 370/395.2 |
| 2007/0060163 A1 | 3/2007 | Jabri et al. | |
| 2007/0257983 A1* | 11/2007 | Miali | 348/14.11 |
| 2007/0297352 A1 | 12/2007 | Jabri et al. | |
| 2008/0310438 A1 | 12/2008 | Jabri et al. | |

FOREIGN PATENT DOCUMENTS

| | | |
|---|---|---|
| JP | 2002-271487 | 9/2002 |
| WO | WO 2004054221 A1 | 6/2004 |

OTHER PUBLICATIONS

Nokia, Packet Video, "Fast Media: An enhancement to H.324 call set up", Document Q1-E04, Attachment #1, ITU Telecommunication Standardization Sector, Study Group 16, Q.1/16 Rapporteur Meeting, Geneva, Switzerland (Nov. 30-Dec. 2, 2005), 20 pages.

Nokia, Packet Video, "Fast Media: Changes to H.324", Document Q1-E04, Attachment #2, ITU Telecommunication Standardization Sector, Study Group 16, Q.1/16 Rapporteur Meeting, Geneva, Switzerland (Nov. 30-Dec. 2, 2005), 6 pages.

Notice of Allowance for U.S. Appl. No. 11/303,858 mailed on Dec. 14, 2009; 6 pages.

Non-Final Office Action for U.S. Appl. No. 11/303,858 mailed on Jul. 20, 2009; 13 pages.

Non-Final Office Action for U.S. Appl. No. 11/303,858 mailed on Mar. 16, 2009; 7 pages.

International Search Report for PCT Application No. PCT/US05/46133 mailed on Oct. 10, 2006; 1 page.

Written Opinion Application No. PCT/US05/46133 mailed on Oct. 10, 2006; 3 pages.

* cited by examiner

FAST SESSION SETUP EXTENSIONS TO H.324

CROSS-REFERENCES TO RELATED APPLICATIONS

This application is a continuation of U.S. patent application Ser. No. 11/303,858, filed Dec. 15, 2005, which claims priority to U.S. Provisional No. 60/636,638, filed Dec. 15, 2004, the disclosures of which are incorporated by reference herein for all purposes.

BACKGROUND OF THE INVENTION

The present invention relates generally to methods of establishing multimedia telecommunication (a multimedia "call") between equipment ("terminals"). More particularly, the invention provides methods for reducing the time required to establish calls between terminals that implement the ITU-T H.324 Recommendation and other Standards and Recommendations derived from or related to this such as the 3G-324M recommendation developed and adopted by the Third Generation Partnership Projects (3GPP and 3GPP2). Merely by way of example, the invention has been applied to the establishment of multimedia telecommunication between 3G-324M (H.324M based protocol) multimedia handsets on a mobile telecommunications network, and between 3G-324M multimedia handsets and H.323 based terminals on a packet network using a Multimedia Gateway to mediate between the protocols used at each endpoint, but it would be recognized that the invention may also include other applications.

H.324 is an International Telecommunication Union (ITU) protocol standard for multimedia communication over general switched networks (GSTN). H.324M is an extension of H.324 for operations over mobile networks, and 3G-324M is a recommendation by the third generation partnership program (3GPP) defining adaptation of H.324M for use within 3GPP and also adopted by 3GPP2. We call H.324-like equipment devices and systems employing protocol based or derived from H.324. H.324-like equipment can connect to other H.324-like equipment via switching centers and to other non-H.324-like equipment through multimedia gateways. An example of a non-H.324-like equipment is an H.323 equipment. H.323 is an International Telecommunication Union protocol Standard for multimedia communication over non-guaranteed bandwidth packet networks. An H.323-like equipment is an equipment that employs a protocol based or derived from the H.323 protocol.

Without any loss of generality, we will use the term "H.324" to indicate H.324-like equipment including H.324M and 3G-324M equipment and "H.323" to indicate H.323-like equipment.

Also without any loss of generality we use the term "equipment" to indicate either a user end equipment such as a handset, or network end equipment such as a switch or gateway. The term "equipment" covers the meaning of "entity." We also use the terms "equipment" and "terminal" interchangeably, and they both indicate the same meaning in the present document.

If a call is made between equipments which are an embodiment of the H.324, H.324M or 3G-324M, the first stage of the call is to establish an end-to-end bearer between the equipments. This stage is called Call Signaling and is outside the scope of H.324, except where modems and the General Switched Telephony Network are used. The second stage of the call is to establish the H.324 session, to provide a means of transporting video, audio and data between the equipments in a format that is known to, and supported by the equipments. In order to do this H.324M makes use of two further ITU-T Recommendations.

The first of these Recommendations used is H.223 "Multiplexing protocol for low bit rate multimedia communication". H.223 specifies a frame-oriented multiplexing protocol which allows the transfer of any combination of digital voice, video and data (e.g. command and control) information over a single communication link. The H.223 may have a number of modes of operation, specified in Annexes A, B and C of the H.223 Recommendation that are intended to provide increased resilience in the presence of errors. These are also known as Mobile Levels 1, 2 and 3. H.223 without the application of any of these Annexes is also sometimes referred to as operating at Mobile Level 0 (base-line). H.324 has the concept of Logical Channels which is a way of providing virtual channels over the circuit switched link. The role of the multiplexer is to combine (multiplex) parts of the data chunks written on the logical channels into frames known as a Multiplexer Protocol Data Unit (MUX-PDU). Logical Channel 0 is always available and is used for Command and Control. Data (voice, video, command and control and other general data) is passed to/from the H.223 multiplexer through bitstream chunks called service data units (SDUs). Before being multiplexed, these different SDUs go through Adaptation Layers where extra information may be added for purposes such as error detection, sequence numbering and retransmission requests.

The second of these Recommendations is H.245 "Control protocol for multimedia communication" which specifies the syntax and semantics of terminal information messages as well as procedures to use them for in-band negotiation at the start of or during communication. The messages cover receiving and transmitting capabilities and preferences, logical channel signaling and control and indication. The messages that are specified in H.245 are expressed in the ITU-T Abstract Syntax Notation (ASN.1) and can be classified as of Request, Response, Command or Indication type. H.245 messages are encoded according to the ASN.1 standard before being transmitted. When a terminal sends an H.245 message of type Request it requires that an appropriate message of type Response is sent by the remote terminal. If the Response (sometimes referred to as an Ack for Acknowledgement) is not received within a certain time, the sending terminal will re-transmit the Request or take another appropriate action if no response has been received for repeated Requests. Re-transmission of requests may occur a number of times. Many of the H.245 messages associated with call set up are of the Request type.

H.245 also requires a reliable link layer for proper operation. The principal means of providing this, specified in Annex A of H.324, is to use the Simple Retransmission Protocol (SRP) or the Numbered Simple Retransmission Protocol (NSRP), in which one or more H.245 messages, known collectively as a MultimediaSystemControl PDU and in the present document as an H.245 PDU, are formed into SRP Command Frames prior to sending, and the receiving terminal must send an SRP Response Frame (Sometimes referred to as an SRP Ack) to acknowledge correct receipt of an SRP Command Frame. No further H.245 messages may be sent by a terminal until the SRP Ack for the last message has been received.

The combined effect of the requirement to send an H.245 Response message for each H.245 Request Message received, and of the need to receive an SRP Ack for every SRP Command Frame sent means that a single H.245 Request message may take some time to be conveyed successfully. The communication involved in sending an H.245 Request message from one terminal (A) to another (B), and getting an H.245 Response (Ack) message back is shown in FIG. 1A, which also shows the SRP Command Frames (SRP CF) and SRP Response Frames (SRP RF or SRP Ack) involved when single H.245 messages are formed into single SRP Command Frames. The H.324 standard allows for multiple H.245 messages to be concatenated into a single SRP Command Frame; however this capability is often not implemented, in which case such terminals may respond only to the first H.245 message encountered in an SRP Command Frame. In some cases, terminals which do not support this capability may malfunction upon receipt of an SDU containing multiple H.245 requests or responses.

We will refer to the time taken for information transmitted by one terminal to reach the other terminal and be reflected back in a response to the first terminal (see examples in FIG. 1A) as a "round trip delay." It should be noted that this round-trip delay assumes devices involved in the media processing and communication do not add delays and is intended to be a representative measure of the network delay. An approximation of the round trip delay value can be determined by use of the H.245 RoundTripDelayRequest and RoundTripDelayResponse messages.

The key steps involved in setting up and connecting a typical H.324 call are as follows:
1. Call signaling (bearer establishment)—outside the scope of H.324. Normally a modem connection if GSTN, through ISDN, or signaling through mobile switching centers in the mobile case.
2. Mobile level detection (MLD)—Where a common Mobile Level is agreed on between equipments. This step is performed by H.324 equipment that supports mobile extensions such as H.324M and 3G-324M equipment.
3. Terminal Capability Exchange (TCS)—H.245 Messaging
4. Master Slave determination (MSD)—H.245 Messaging
5. Open/Close Logical Channels (OLC)—H.245 Messaging
6. Multiplexer Table Entries Exchange (MTE)—H.245 Messaging Steps (3) to (6) are performed using a sequence of H.245 Request and Response messages as described above and illustrated in FIG. 1A. The full sequence of Request and Response messages involved in an H.324 call is shown in FIG. 1B. Note the order of steps (5) and (6) above can be interchanged. It should be noted that Steps (3) to (6) relate to procedures that are defined by underlying state machines that are also known as Signaling Entities. The relevant signaling entities are:
1. Capability Exchange Signaling Entity (CESE)
2. Master Slave Determination Signaling Entity (MSDSE)
3. Logical Channel Signaling Entity (LCSE)
4. Multiplex Table Signaling Entity (MTSE)

Once these steps have completed, media (video, audio and data) can flow between the terminals. Note the H.245 messages flow on the Logical Channel 0 which as previously described is predefined and carried by the means of the multiplexer predefined Multiplex Table Entry 0. Once other Multiplex Table Entries have been exchanged these can also be used in conjunction with H.245 messages.

The key steps above are often handled sequentially; however this results in as many as ten H.245 message round trip delays in order to establish an H.324 session with two logical channels in each direction. In addition, the SRP scheme (or Numbered version—NSRP, in cases where the mobile level is greater than zero) used for H.324/H.245, which requires an SRP message to be received by the endpoint for every message sent, prior to sending any other message, regardless of whether it is associated with the same Signaling Entity or not, further limits the scope to pipeline messages on the network, making call set up slower than if this were not the case. SRP messages are not shown in FIG. 1B.

For H.324M, the Terminal Capabilities Set request (TCS) step described above and shown in FIG. 1B is preceded by a mobile level detection/multiplexer synchronization phase. This consists of each terminal transmitting a repeating pattern of bits (flags) that indicate the highest Mobile Level at which it operates. Each terminal examines the flags that it is receiving. If these flags represent a lower Mobile Level then the terminal drops down to the same lower level. When both terminals are transmitting the same flag sequence this step completes.

Arising from the set of procedures described above that are required to take place to establish an H.324M call, when a call is made from a terminal which is an embodiment of the H.324 it is prone to suffer from long call set up time, which is the interval between the time that the call signaling is initiated to the time that the exchange of voice and video commences between an H324-like end-point (H.324, H.324M or 3G-324M) and other terminals whether H.324-like or not.

The ITU Recommendation H.323 uses H.245 in a similar manner to H.324 for signaling command, control and indication messages related to a call. Unlike H.324, H.323 is equipped with a number of features to speed up the call set up time between H.323 equipment. Similar techniques exist for the IETF Session Initiation Protocol (SIP) protocol.

Thus there exists a need for techniques to speed up the call set up between H.324 like terminals and other terminals (including servers) either of the H.324 type directly, or terminals such as H.323 via multimedia gateways that terminates the H.324 side and would have an H.324-like termination in them. The differences between the H.324 protocol (and its extensions such as H.324M and 3G-324M) and H.323 and other protocols mean that additional aspects need to be considered when introducing call establishment speed-up techniques for H.324-like terminals. Such differences include the information about mobile levels where they are used and the messaging and information related to the H.223 multiplexer such as its multiplex table entries, adaptation layers and so on.

SUMMARY OF THE INVENTION

According to the present invention, devices for telecommunications are provided. More particularly, the invention provides multimedia devices for supporting video in session of calls between terminals that implement the ITU-T H.324 Recommendation and other Standards and Recommendations derived from or related to this such as the 3G-324M recommendation developed and adopted by the Third Generation Partnership Projects (3GPP and 3GPP2). In other embodiments, the invention has been applied to support video in sessions of calls between 3G-324M (H.324M based protocol) multimedia handsets on a mobile telecommunications network, and between 3G-324M multimedia handsets and other terminals on a packet network using a Multimedia Gateway to mediate between the protocols used at each endpoint, but it would be recognized that the invention may also include other applications.

According to an embodiment of the present invention, a multimedia device configured to support video in a session of a call includes one or more media providing devices and one or more computer codes directed to performing an initialization process for the one or more media providing devices. The initialization process may be performed at an initialization time prior to or substantially equal to a first time prior to or substantially equal to a reception time associated with receiving an indication of call acceptance from a called device, or a second time prior to or substantially equal to an acceptance time associated with call acceptance by the multimedia device. The multimedia device also includes one or more computer codes directed to transmitting one or more preferences for the session according to a session setup procedure, one or more media processors coupled to the one or more media providing devices, and one or more computer codes directed to transmitting media on one or more media channels associated with the session.

According to another embodiment of the present invention, a multimedia device configured to support video in a session of a call includes one or more media providing devices and one or more media processors coupled to the one or more media providing devices. The multimedia device also includes one or more computer codes directed to initializing the one or more media processors. The initializing may occur at an initialization time prior to or substantially equal to a first time prior to or substantially equal to a reception time associated with receiving an indication of call acceptance from a called device, or a second time prior to or substantially equal to an acceptance time associated with call acceptance by the multimedia device. The multimedia device also includes one or more computer codes directed to transmitting one or more preferences for the session according to a session setup procedure, and one or more computer codes directed to transmitting media on one or more media channels associated with the session.

According to another embodiment of the present invention, a multimedia device configured to support video in a session of a call includes one or more media output devices, and one or more media processors coupled to the one or more media output devices. The multimedia device also includes one or more computer codes directed to initializing the one or more media processors. The initializing may occur at an initialization time prior to or substantially equal to a first time prior to or substantially equal to a reception time associated with receiving an indication of call acceptance from a called device, or a second time prior to or substantially equal to an acceptance time associated with call acceptance by the multimedia device. The multimedia device also includes one or more computer codes directed to transmitting one or more preferences for the session according to a session setup procedure, and one or more computer codes directed to receiving media on one or more media channels associated with the session.

According to another embodiment of the present invention, a multimedia infrastructure device configured to support video in a session of a call includes one or more media reception ports, one or more media processors coupled to the one or more media reception ports, and one or more computer codes directed to initializing the one or more media processors. The initializing may occur at an initialization time prior to or substantially equal to a first time prior to or substantially equal to a reception time associated with receiving an indication of call acceptance from a called device, or a second time prior to or substantially equal to an acceptance time associated with call acceptance by the multimedia infrastructure device. The multimedia device also includes one or more computer codes directed to transmitting one or more preferences for the session according to a session setup procedure, and one or more computer codes directed to transmitting media on one or more media channels associated with the session.

According to another embodiment of the present invention, a multimedia infrastructure device configured to support video in a session of a call includes one or more media transmission ports, one or more media processors coupled to the one or more media transmission ports, and one or more computer codes directed to initializing the one or more media processors. The initializing may occur at an initialization time prior to or substantially equal to a first time prior to or substantially equal to a reception time associated with receiving an indication of call acceptance from a called device, or a second time prior to or substantially equal to an acceptance time associated with call acceptance by the multimedia infrastructure device. The multimedia device also includes one or more computer codes directed to transmitting one or more preferences for the session according to a session setup procedure, and one or more computer codes directed to receiving media on one or more media channels associated with the session.

Many benefits are achieved by way of the present invention over conventional techniques. For example, embodiments of the present invention provide for reductions in call set up time, thereby enhancing the customer experience. Additionally, other embodiments reduce the call set up time variability and reduce operator and network billing considerations. Moreover, embodiments of the present invention maintain compatibility with existing protocols. Depending upon the embodiment, one or more of these benefits, as well as other benefits, may be achieved. The objects, features, and advantages of the present invention, which to the best of our knowledge are novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF SPECIFIC EMBODIMENTS

Figure 1A:
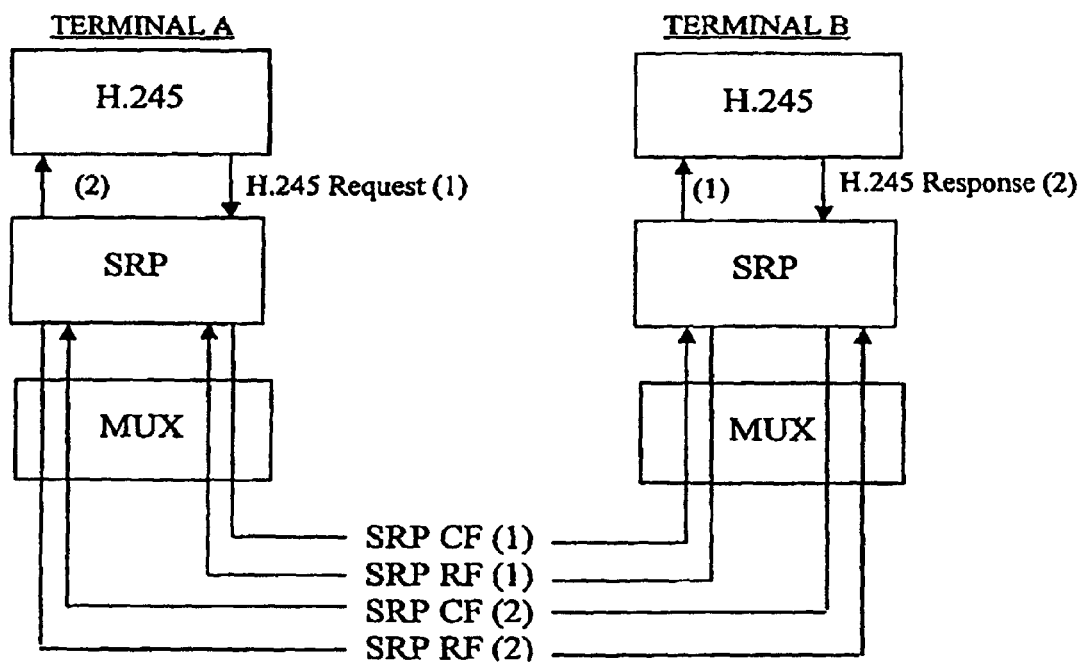
FIG. 1A is a diagram useful in illustrating the communications that flow between two H.324 terminals when an H.245 Request message is sent from one terminal to the other.
Figure 1B:
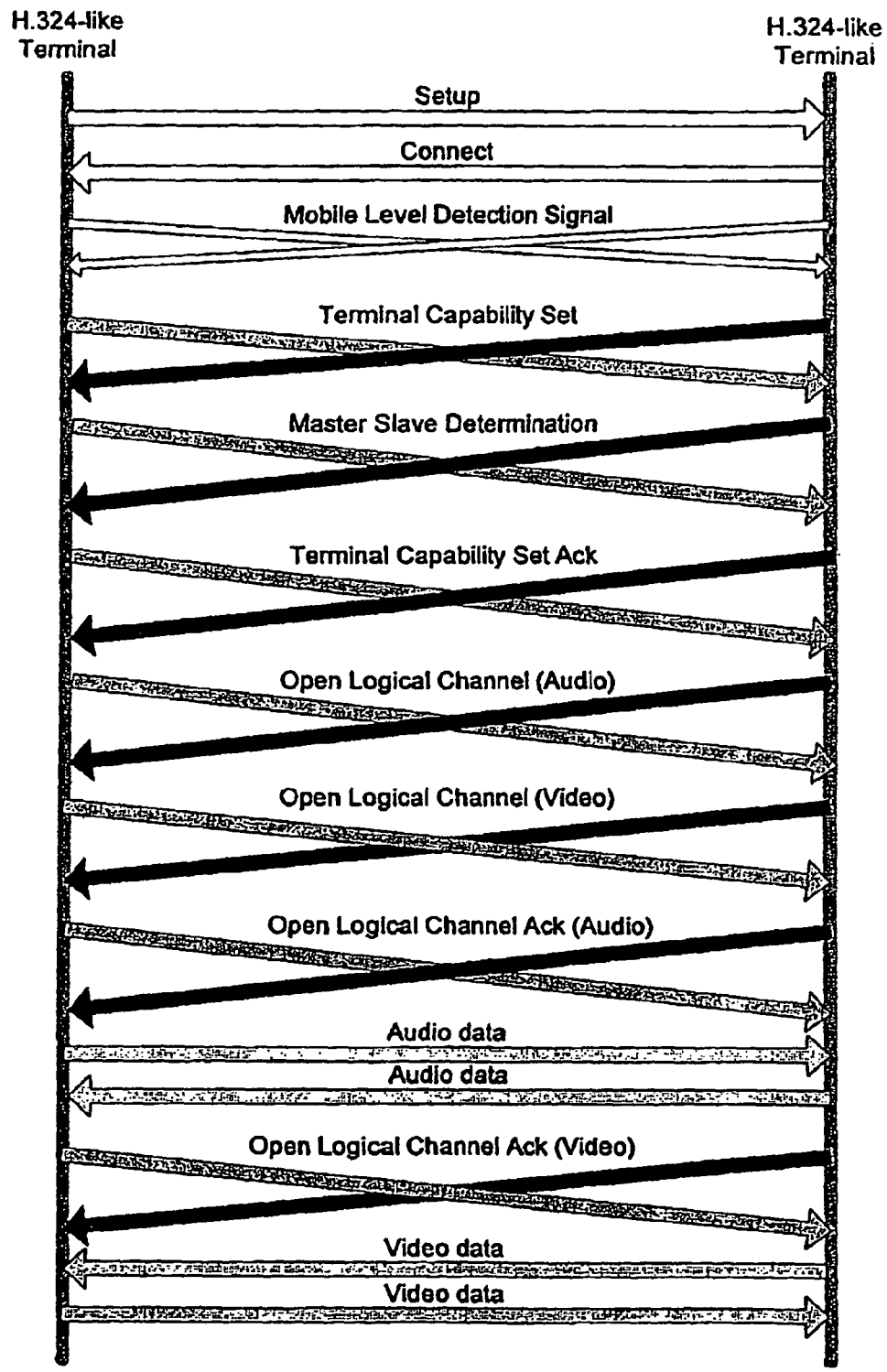
FIG. 1B illustrates session set up for a call between H.324-like equipment. Note in this case unidirectional video channels are used (e.g. video over adaptation layer AL2 of the H.223 multiplexer)

The establishment of a typical videotelephony session between two H.324M (H.324 with its Annex C) terminals requires the completion of several procedures such as mobile level detection and H.245 messaging procedures. Furthermore, the reliable transport of H.245 messages is achieved using the (Numbered) Simple Retransmission Protocol (NSRP) which, in essence, provides equivalent functionality as TCP. Although the optimization of the NSRP using techniques similar to that of TCP could reduce the session set up time to some extent, the delays are still too substantial and are still longer than those of H.323 without FastConnect. The introduction of faster session set up techniques into H.324 will make it consistent in terms of delays with similar videotelephony protocols (H.323 and SIP) and will significantly enhance the user experience. Collectively, these techniques are referred to as AnswerFast.

According to embodiments of the present invention, several techniques, which are described more fully below, are proposed for speeding up session set up time. In a particular embodiment, one technique is added to an H.324M/3G-324M Implementer Guide and the remaining three techniques are added as Annexes to H.324. One of ordinary skill in the art would recognize many variations, modifications, and alternatives.

The addition of fast establishment techniques as an Annex to H.324 and their recommendation will significantly enhance the user experience of clients using devices based on these standards. Further, a recommendation of 3GPP to use the annex for 3G-324M will also lead to significantly enhanced user experience for devices in targeted to 3GPP releases.

Four session speed-up methods are described in the present specification. Collectively, the methods are referred to herein as AnswerFast and they include the following:

AnswerFast1: This method enables terminals to group H.245 messages in a particular way to speed up the session set up time. This method is proposed as an addition to the H.324M/3G-324M Implementer Guide.

AnswerFast2: This method makes use of fields in the H.245 TerminalCapabilitySet request message. This method is proposed as an Annex to the H.324 Recommendation.

AnswerFast3: This method makes use of the signaling layer (TS 24.008) to incorporate one or more preferred operation modes. This method is proposed as an Annex to the H.324 Recommendation.

AnswerFast4: This method transmits the preferred operation mode as the first burst of bits transmitted on the bearer channel. This method is proposed as an Annex to the H.324 Recommendation.

As an example, one hierarchical order of utilizing the AnswerFast techniques in H.324 is:

1. AnswerFast3
2. AnswerFast4
3. AnswerFast2
4. AnswerFast1
5. Normal session without AnswerFast From the hierarchy, AnswerFast1 may be adopted after successful utilization of AnswerFast3 and AnswerFast4. AnswerFast1 may be adopted at the same time as AnswerFast2. One of ordinary skill in the art would recognize many variations, modifications, and alternatives.

Additional information related to applicable telecommunications standards is found, for example, in the following references, which are incorporated herein by reference in their entirety for all purposes.

1. H.324 ITU-T Recommendation—Terminal for low bitrate multimedia communication. 03/2002.
2. 3GPP TS 24.008—Mobile radio interface layer 3 specification; Core Network Protocols.
3. 3GPP TS 26.110—Codec for Circuit Switched Multimedia Telephony Service.
4. 3GPP TS 26.111—Codec for circuit switched multimedia telephony service; Modifications to H.324.

AnswerFast1

According to embodiments of the present invention, AnswerFast1 is proposed as an addition to the H.324 Implementer's Guide. AnswerFast1 provides a mechanism whereby terminals combine multiple H.245 messages in order to reduce the session set up time. The usage of H.245 within H.324 allows terminals to concatenate multiple H.245 messages into a single PDU, thus avoiding the need to use two round trips for each request/response pair (due to the need for an SRP response for each PDU). Although some deployed H.324 terminals do not take advantage of this capability, other H.324 terminals will incorporate these techniques.

By allowing terminals to use concatenated H.245, AnswerFast1 techniques reduce the number of round trips required for call set up from ten to three. As an example, a terminal can send a MasterSlaveDetermination Request and TerminalCapabilitySet Request messages in a single PDU, or can send TerminalCapabilitySetAck, MasterSlaveDeterminationAck, Open Logical Channel Requests and MultiplexEntrySend Request messages in a single PDU.

According to embodiments of the present invention, AnswerFast1 takes advantage of the existing protocol facilities, rather than as an extension to it. Thus, a terminal that implements AnswerFast1 does not need to define any behavior or protocol elements in addition to those already allowed and defined by the H.245 and H.324 standards.

Figure 2:
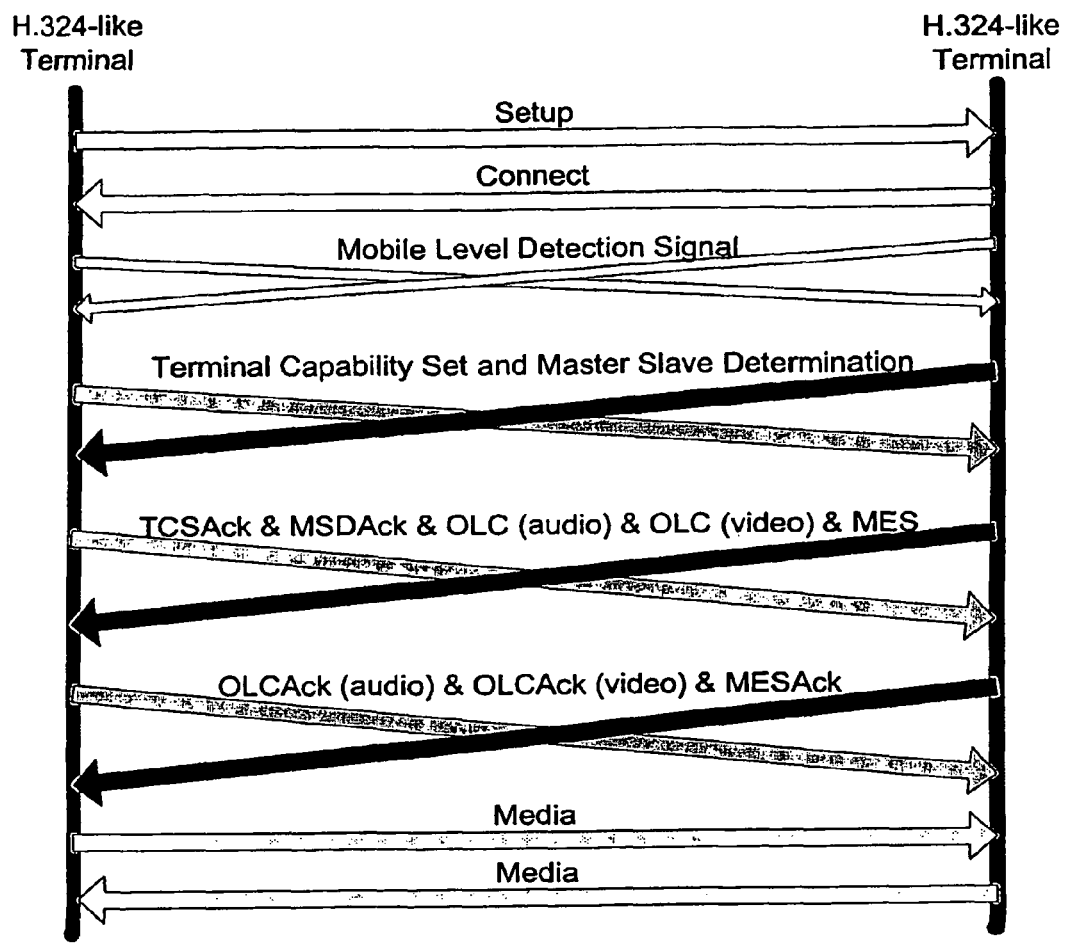
FIG. 2 is a simplified diagram illustrating the use of AnswerFast1 according to an embodiment of the present invention.

FIG. 2 is a simplified diagram illustrating the use of AnswerFast1 according to an embodiment of the present invention. In general, the media may be unidirectional or bidirectional. As illustrated in FIG. 2, H.245 message are concatenated in the AnswerFast1 technique.

Interoperability with terminals that do not implement AnswerFast1 is achieved by noting that if the receiving terminal ignores the second and subsequent H.245 elements in a PDU, the transmitting terminal can detect any time-outs and continues the H.245 messaging using one H.245 message per PDU.

AnswerFast2

According to another embodiment of the present invention, the AnswerFast2 method uses the H.245 protocol to transmit "special" messages that are aimed at shortening the procedure to establish a session. The concept is to transmit special messages as soon as possible, and this can be done in various ways. Which way is selected depends on how stringent one wants to be with regards to departure from conventional H.324 session establishment. For example, the H.324 protocol mandates that the first H.245 message be the TerminalCapabilitySet (TCS) Request message. Hence one can insert the special messages in the TCS. Alternatively, if one is not concerned about literal compliance with the H.324 standard, one can also transmit a special message prior to the TCS (in order of appearance in the message). Embodiments of the present invention cover the concept of transmitting special message(s) for the purpose of speeding up the session establishment, regardless of the actual position and order of the message, which will depend on the particular embodiment.

These special message(s) are termed "non-standard" as the conventional H.324 protocol does not provide for them and they are not yet standardized. For example, the non-standard message(s) can be inserted as a "non-standard" Capability of the TerminalCapabilitySet request message, and this is the approach that we will describe, without loss of generality, to illustrate the mechanics of the operations. The "non-standard" Capability allows H.324-like terminals to define a mode of operation that enables faster session set up. As discussed more fully below, AnswerFast2 enables the minimization of the amount of information that is incorporated in the non-standard Capability. As a result, embodiments utilizing AnswerFast2 reduce the amount of transmitted information, for example, to a minimum amount. We refer to the non-standard Capabilities as Non-Standard Capabilities or Non-Standard H.245 Capabilities.

Figure 3A:
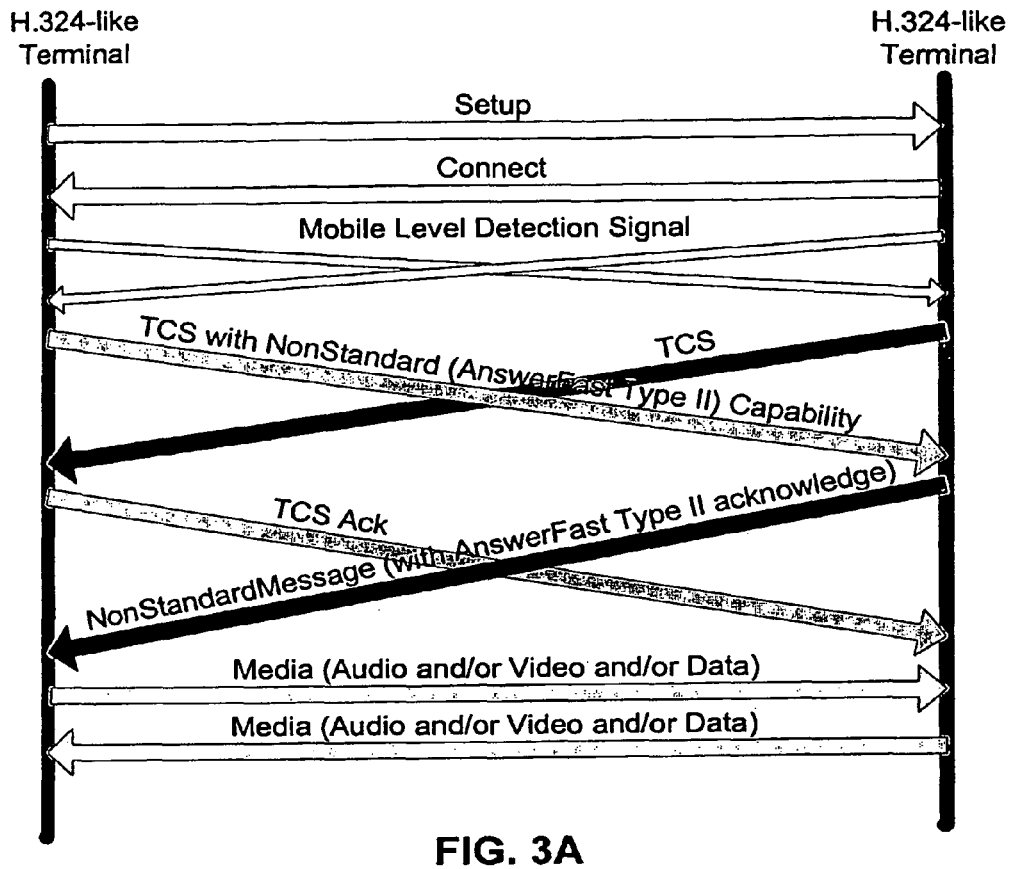
FIG. 3A is a simplified diagram illustrating the use of AnswerFast2 according to an embodiment of the present invention.

FIG. 3A is a simplified diagram illustrating the use of AnswerFast2 according to an embodiment of the present invention. As shown in FIG. 3A, a H.245 NonStandard Capability is used between two H.324 terminals that support AnswerFast2. The message flow between the two H.324 terminals supporting AnswerFast2 in H.245 NonStandard Capability is illustrated. The media may be a unidirectional or bidirectional channel. Using a minimal amount of information to signal a capability through the use of bit fields and/or use of profiles minimizes the amount of information required to be transmitted. This in turn leads to minimized call set up time, even in the reduced call set up time case.

For AnswerFast2, the profiles can be the same as described for either AnswerFast3 or AnswerFast4, or any variants listed. It is also possible, with minimum additional information, or special use and interpretation of an otherwise unused field, to indicate the use of a system of predefined rules based on already available information. An example could be a capability indication and the use of rules to select from the conventional capabilities as to which channels would be opened in an accelerated fashion. This could be performed completely by inference, or could also be explicitly acknowledged. An acknowledgment may also contain extra session information, such as further information used to open a channel.

To use AnswerFast2 in H.245 NonStandard Capability, the calling terminal includes a capability of type NonStandardParameter in the TerminalCapabilitySet it sends to the called party terminal (a possible format for this capability is described more fully below). This capability contains additional information needed by the called terminal to start the session. By including this NonStandard Capability, the calling party is enabled to accept the decision of the called party as to whether AnswerFast2 is used, and what channels are selected.

If the called terminal accepts the AnswerFast2 capability, it may respond with a NonStandardMessage containing the further information needed for the calling terminal to start the session (a possible format for this capability is described more fully below). In some embodiments, the called terminal does not include any additional capabilities into the TerminalCapabilitySet it sends to the called terminal. Additionally, other H.245 messages, such as a MasterSlaveDetermination request message, may be concatenated with the TerminalCapabilitySet in case the fallback procedure as described herein is used.

Figure 3B:
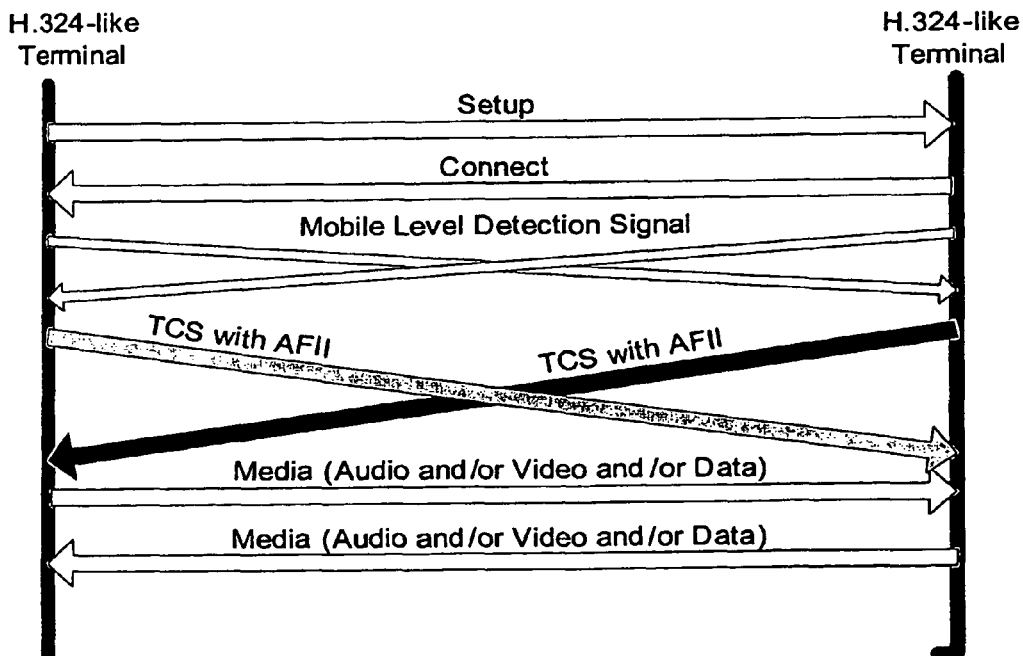
FIG. 3B is a simplified diagram illustrating the use of AnswerFast2 according to another embodiment of the present invention.

FIG. 3B is a simplified diagram illustrating the use of AnswerFast2 according to another embodiment of the present invention. As shown in FIG. 3B, a H.245 NonStandard Capability is used between two H.324 terminals that support AnswerFast2. The message flow between the two H.324 terminals supporting AnswerFast2 in H.245 NonStandard Capability is illustrated. In this case inference or a preference rule set is used at each terminal and the optional response message is not required to be sent before media transmission may begin. The media may be a unidirectional or bidirectional channel.

AnswerFast2 Request Capability

According to embodiments of the present invention, the AnswerFast2 Request Capability is provided as follows. A calling terminal requests AnswerFast2 by including a capability of type NonStandardParameter into the outgoing TerminalCapabilitySet. This capability is identified by a NonStandardIdentifier with an object ID to be determined. The data field of the NonStandardParameter is populated with a PER encoded structure with the following ASN definition:

```
AnswerFast2Request ::= SEQUENCE
{
version            INTEGER (1..255),
    afkey          INTEGER (1..MAX),
    terminalType   INTEGER (0..255), -- For
MasterSlaveDetermination
    multiplexEntryDescriptors SET SIZE (1..15) OF
                         MultiplexEntryDescriptor
OPTIONAL, -- MTE
    ...
}
```

The version field indicates the version of the AnswerFast2 extension. The afkey field is a unique identifier to identify it is an AnswerFast2 non-standard parameter and is defined as 71123521. The terminalType field is encoded with the same value as would be used in the terminalType field of an outgoing H.245 MasterSlaveDetermination Request from the calling party. And finally, the multiplexEntryDescriptors are settings as would be used in an outgoing MultiplexEntrySend Request.

The NonStandardIdentifier is defined as "{iso (1) member-body (2) au (36) acn (71123521) vendor specific 1 (1) vendor specific 2 (1)}", which represents AnswerFast2.

In general, it is preferable that a calling terminal be able to open logical channels for all transmitAudioCapability, receiveAudioCapability (treated also as having the ability to transmit audio), receiveAndTransmitAudioCapability, transmitVideoCapability receiveVideoCapability (treated also as having the ability to transmit audio), and receiveAndTransmitVideoCapability entries that are advertised in the outgoing TerminalCapabilitySet, as the receiving terminal will interpret each capability as a proposed OpenLogicalChannel request. Each indicated capability (receive and/or transmit) may be interpreted by the receiver as a proposition to open a logical channel matching the capability. Other rules, such as a preference order for acceptance, or a limitation based on media type could be applied to determine properties of a channel to be opened. A media type limitation could take the form of limiting accelerated session set up to only a single audio, single video or single data channel.

Additionally, it is generally preferable that there is symmetry for multiplex table entries. Thus, in some embodiments, the calling terminal sets its multiplex table to be exactly as the calling terminal specifies for its transmitted channels. A terminal may determine its multiplex table entries using some method, predefined, predetermined or explicit. In cases wherein the called terminal sets its multiplex table entries to be exactly as the calling terminal uses, the receiver is allowed to properly accept and process data that is received.

The AnswerFast2 capability is contained in a CapabilityDescriptor within the capability table that is distinct from the audio, video, and user indication capabilities. This ensures that terminals that do not support AnswerFast2 will ignore the additional entry. Endpoints that support AnswerFast2 generally provide multiple capabilities in the same CapabilityDescriptor as the AnswerFast2 capability. This allows for future enhancement of the AnswerFast2 procedure using new NonStandardIdentifier values.

AnswerFast2 Response

According to embodiments of the present invention, an AnswerFast2 Request Response may be provided as follows. If a called terminal receives a TerminalCapabilitySet containing an AnswerFast2 capability, it will perform a master slave determination by comparing the terminal type value in the received AnswerFast2 request with the value for the local terminal. The highest value will be selected as the master. In the event of equal terminal type values, the calling terminal will be selected as the master. Alternatively if the MasterSlaveDetermination Request is transmitted with the TerminalCapabilitySet it may instead be used for Master Slave determination.

The called terminal will analyze the received capability table to determine the proposed OpenLogicalChannel and multiplex table entries for the new connection. The called terminal may respond with a normal TerminalCapabilitySetAck if it cannot derive an acceptable channel configuration, or if it is unable to accept the multiplexEntryDescriptors provided. This will also occur if the called terminal does not support AnswerFast2.

If acceptable channel configurations and multiplex table entries can be derived, the called party may replace the normal TerminalCapabilitySetAck with a H.245 ResponseMessage of type NonStandardMessage. The NonStandardIdentifier of the non-standard response message will have the same object ID as the incoming AnswerFast2 Request. The data field of the NonStandardParameter is populated with a PER encoded structure with the following ASN definition:

```
AnswerFast2Response ::= SEQUENCE
{
    sequenceNumber SequenceNumber,
    version INTEGER (1..255),
    decision        CHOICE      -- MasterSlaveDetermination
result based on "terminalType" compare
    {                           -- if terminalType is the
same then caller
        master    NULL,         -- is always the master
        slave     NULL
    },
    multiplexTableEntryNumber SET SIZE (1..15) OF
MultiplexTableEntryNumber OPTIONAL,
    logicalChannels SEQUENCE OF OpenLogicalChannel,
    ...
}
```

The sequenceNumber field corresponds to the sequence number value of the TerminalCapabilitySetAck that is being replaced by this response. This allows the calling terminal to maintain H.245 message synchronization. The decision field indicates the master/slave status of the called terminal, i.e. the calling terminal sets its master/slave status to the opposite of the value indicated in this field. The multiplexTableEntryNumber field contains a list of all multiplex table entries that were accepted by the called terminal. In general, there is an implied symmetry for multiplex table entries. The called terminal sets its multiplex table to be exactly as the caller terminal specifies for its transmitted channels.

The logicalChannels field contains a list of all channels that both terminals will transmit. Channels transmitted from the calling party are indicated by a data Type field of value nullData in the forwardLogicalChannelParameters element in combination with an optional reverseLogicalChannelParameters containing the channel information.

Fallback from AnswerFast2

According to embodiments of the present invention, fallback techniques are provided for terminals that do not support one or more of the AnswerFast techniques described herein. For example, for fallback from AnswerFast2, if the called terminal does not support AnswerFast2, or if it rejects the proposed AnswerFast2 parameters, the called terminal receives a conventional TerminalCapabilitySetAck and normal H.245 negotiation are used to continue the call.

Figure 4:
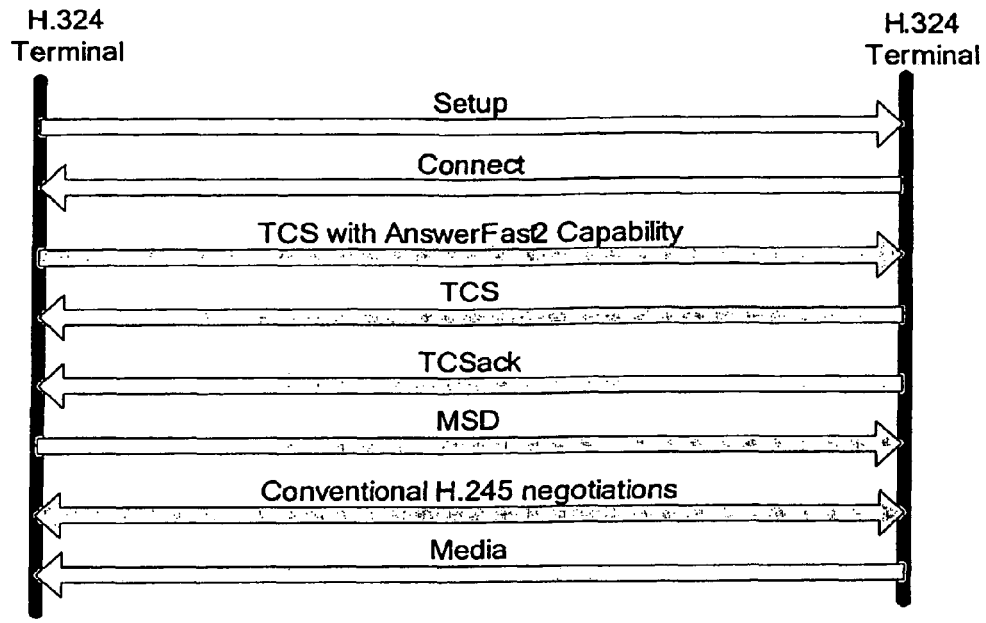
FIG. 4 is a simplified diagram illustrating fallback from AnswerFast2 according to an embodiment of the present invention.

FIG. 4 is a simplified diagram illustrating fallback from AnswerFast2 according to an embodiment of the present invention. As illustrated in FIG. 4, the calling terminal attempts a call with AnswerFast2 in H.245 NonStandard Capability to a terminal that does not support AnswerFast2. After the calling terminal receives the TCSAck, an MSD is transmitted an conventional H.245 negotiations are conducted.

AnswerFast3

If the underlying call signaling network is capable of transporting terminal-defined additional data elements, AnswerFast3 allows a H.324 calling terminal to specify a list of session profiles as part of the Q.931 SETUP PDU. This technique shares some similarities with the procedures performed by H.323 FastConnect. According to embodiments of the present invention, a session profile is provided that specifies values for the multiplexer as well as H.245 parameters for codecs and logical channels. In a particular embodiment, exact values for the all aspects of the multiplexer, H.245 parameters for the codecs to be used, and the logical channels are specified by the session profiles. Using the profiles provided by embodiments of the present invention, the terminals are enabled to exchange the parameters of the session at the time the called terminal accepts the call, rather than using mobile level detection, multiple H.245 procedures, and NSRP round trips after the call is accepted.

According to an embodiment of the present invention, session profiles define the following information either explicitly or implicitly:

Initial Mobile Level
Terminal type for determining Master/Slave status
Video codec(s)
Audio codec(s)
Logical channel numbers
H.223 MUX table entries and parameter limits Profiles as described herein can cover several characteristics of a call, all characteristics of a call, or only a single characteristic. Additionally, profiles could be coupled with preference rules that either make them additive, mutually exclusive, or any combination thereof. One of ordinary skill in the art would recognize many variations, modifications, and alternatives.

Merely by way of example, separate profiles could be used for audio, video, data and multiplexer. Overarching profiles could use sub-profiles as piece parts or define each detail explicitly. Profiles may also refer to other standard's and recommendation's profiles. Profiles may indicate a "transmit only", a "receive only" or a "transmit and receive" capability. Profiles could also be used on an individual codec basis, whereby each codec has a different profile associated with it.

Profile modifiers can be used to modify aspects of several profiles in a more general way. For example, if the bandwidth of a link was to increase, for instance double (due to bonding or otherwise) the bandwidth associated with each channel could also increase (e.g., double). However, if the profile is hard coded, the channel would be under utilizing the resources. In this case a rule could be applied to all profiles such that all channels with variable bit rates get a proportional increase, while constant bit rates do not. The re-allocation could be proportional, or redundancy coding could be put into effect on certain channels with a resulting effective rate change. Other profile features may also be modified on bit rate, such as video frame size or frame rate. Thus, after a certain bit rate is met, the next frame size up (i.e. QCIF→CIF) may be used, or the frame rate may be increased.

Other profiles may be modified such that they only become active under certain other conditions. An example is a CIF video profile that does not become active until a predetermined sufficient bit rate is met. In a particular embodiment, the predetermined sufficient bit rate is 128 kbps, whereas in other embodiments, other bit rates are utilized.

An additional modifier may be the indication of an expectation of symmetric properties for a session. One such symmetry might be the desire to have the same codec running for both transmit and receive. This may be desirable due to some limitations in some devices such as processing power or internal memory.

Audio profiles can specify many characteristics, with non limiting examples relating to codec, maximum bit rate and maximum number of AL-SDU (max al-sdu) frames allowed. Video profiles can specify many characteristics, including, but not limited to codec, frame size, maximum bit rate, unrestricted Vectors, arithmeticCoding, advancedPrediction, pbFrames, decoderConfigurationInformation, combinations thereof, and the like. Multiplexer profiles can specify many characteristics, including, but not limited to multiplexer level and use of double flag or optional header, as well as relationships between other channels for multiplexing data/media streams.

Profiles may also have other predefined characteristics associated with them, such as pre-assigning logical channel number(s) to a given logical channel type or profile definition. Profiles can also define relationships between a codec or logical channel and a multiplexer table entry or multiplexer table entry number. A simple rule would be mapping logical channel number to the multiplexer table entry number, or vice versa, an example being multiplexer table entry 1 mapping to/from logical channel number 1 for an audio channel and multiplexer table entry 2 mapping to/from logical channel number 2 for a video channel.

Profiles could be created in the Annex to the H.324 recommendation. Creating or refining further profiles in separate documents to the H.324 Recommendation may be used to extend profiles in a way more useful to industry. A separate set of profiles could be specified and recommended by H.324 and by 3GPP/3G-324M. Different profiles could be used in different releases of 3GPP/3G-324M allowing for the reuse of profile indices/identifiers and greater control over capabilities required/expected in a device. Embodiments of the present invention are not limited to presently available profiles, but include the use of future profiles as they are developed and standardized.

Merely by way of example, a number of audio, video, and multiplex profiles are listed in the following description. These profiles are not intended to limit the present invention, but only to provide examples of profiles utilized by various embodiments of the present invention.

Audio Profiles
audioProfile 0 (0x0000)
G.723.1 Audio
Baseline profile [TBD]
[Other subsets TBD]
audioProfile 256 (0x0100)
G.711 Audio
Baseline profile [TBD]
[Other subsets TBD]
audioProfile 4096 (0x1000)
GSM-AMR Audio
Baseline profile [TBD]
audioProfile 16385 (0x1001)
GSM-AMR Audio
3G-324M recommended profile [TBD]
[Other subsets TBD]
Video Profiles
videoProfile 0 (0x0000)
H.263 QCIF Video
Baseline profile [TBD]
[Other subsets TBD]
videoProfile 16 (0x0010)
H.263 QCIF Video
3G-324M recommended profile [TBD]
[Other subsets TBD]
videoProfile 256 (0x0100)
H.261 QCIF Video
Baseline profile [TBD]
[Other subsets TBD]
videoProfile 4096 (0x1000)
MPEG4-Video
3G-324M recommended profile [TBD]
Multiplex Profiles (In the following profiles, audio channels are represented as A1, A2, A3, etc, and video channels are represented as V1, V2, V3, etc.
multiplexProfile 0 (0x0000)
1={LCN A1,RC UCF}
multiplexProfile 1 (0x0001)
1={LCN V1,RC UCF}
multiplexProfile 256 (0x0100)
1={LCN A1,RC UCF},
2={LCN V1,RC UCF}
multiplexProfile 512 (0x0200)
1={LCN A1,RC UCF},
2={LCN V1,RC UCF},
3={LCN A1,RC 25}, {LCN V1,RC UCF}
4={LCN A1,RC 22}, {LCN V1,RC UCF}
5={LCN A1,RC 5}, {LCN V1,RC UCF}
6={LCN A1,RC 25}, {LCN0,RC UCF}
7={LCN A 1,RC 22}, {LCN0,RC UCF}
8={LCN A1,RC 5}, {LCN0,RC UCF}
multiplexProfile 513 (0x0201)
1={LCN A1,RC UCF},
2={LCN V1,RC UCF},
3={LCN A1,RC 26}, {LCN V1,RC UCF}
4={LCN A1,RC 23}, {LCN V1,RC UCF}
5={LCN A1,RC 6}, {LCN V1,RC UCF}
6={LCN A1,RC 26}, {LCN0,RC UCF}

7={LCN A1,RC 23}, {LCN0,RC UCF}
8={LCN A1,RC 6}, {LCN0,RC UCF}
multiplexProfile 528 (0x0210)
1={LCN A1,RC UCF},
2={LCN V1,RC UCF},
3={LCN A1,RC 32}, {LCN V1,RC UCF}
4={LCN A1,RC 27}, {LCN V1,RC UCF}
5={LCN A1,RC 22}, {LCN V1,RC UCF}
6={LCN A1,RC 20}, {LCN V1,RC UCF}
7={LCN A1,RC 19}, {LCN V1,RC UCF}
8={LCN A1,RC 17}, {LCN V1,RC UCF}
9={LCN A1,RC 15}, {LCN V1,RC UCF}
10={LCN A1,RC 14}, {LCN V1,RC UCF}
11={LCN A1,RC 7}, {LCN V1,RC UCF}
12={LCN A1,RC 2}, {LCN V1,RC UCF}
13={LCN A1,RC 32}, {LCN0,RC UCF}
14={LCN A1,RC 7}, {LCN0,RC UCF}
15={LCN A1,RC 2}, {LCN0,RC UCF}
multiplexProfile 529 (0x0211)
1={LCN A1,RC UCF},
2={LCN V1,RC UCF},
3={LCN A1,RC 33}, {LCN V1,RC UCF}
4={LCN A1,RC 28}, {LCN V1,RC UCF}
5={LCN A1,RC 23}, {LCN V1,RC UCF}
6={LCN A1,RC 21}, {LCN V1,RC UCF}
7={LCN A1,RC 20}, {LCN V1,RC UCF}
8={LCN A1,RC 18}, {LCN V1,RC UCF}
9={LCN A1,RC 16}, {LCN V1,RC UCF}
10={LCN A1,RC 15}, {LCN V1,RC UCF}
11={LCN A1,RC 8}, {LCN V1,RC UCF}
12={LCN A1,RC 3}, {LCN V1,RC UCF}
13={LCN A1,RC 33}, {LCN0,RC UCF}
14={LCN A1,RC 8}, {LCN0,RC UCF}
15={LCN A1,RC 3}, {LCN0,RC UCF}

In some embodiments, logical channels are pre-assigned. For example, for one or more audio channels, the logical channel numbers are 1 (A1), 17 (A2), 33 (A3), and the like. For one or more video channels, the logical channel numbers are 2 (V1), 18 (V2), 34 (V3), and the like. It should be noted that AMR and MPEG4 are as defined in 3GPP and are used here merely for reference. One of ordinary skill in the art would recognize many variations, modifications, and alternatives.

Encapsulation in Q.931 Messages

Another aspect of the Q.931 signaling used in 3GPP is that some Information Elements may be preferred over others. For example User-User Information Elements in Set up/Connect messages may be blocked by Mobile Switching Centers (e.g. for fraud prevention reasons). Hence using other Information Elements in the Set up/Connect Q.931 messages such as the Subaddress IE (see. 3GPP TS 24.008) could be more transparent to the network infrastructure.

This proposal leaves the choice of the appropriate information element to be done with the vendors and equipment providers. The Subaddress field may be more appropriate than the User-User Information Field. If this is the case, a maximum size of space available to a session profile information may be limited to 20 octets.

To efficiently utilize the limited space available in Q.931 related signaling for terminal/user defined information (e.g. User-User Information Element, Subaddress Information Element), it is preferable to use predefined session profiles rather than incorporating encoding of messages that explicitly define the session profile.

Regardless of whether explicit or implicit session profiles are used, the calling party transmits its preferred session profiles in its Set up message. The called party responds with a selected or accepted session profile in one of its response (Alerting, Call proceeding, Connect) messages. If a calling terminal receives a session profile acknowledge in a response message it can proceed with using the session profile as though the TerminalCapabilitySet, MasterSlaveDetermination, MultiplexEntrySend, and OpenLogicalChannel state machines have completed and established the specified profile.

After successfully setting up a session using a fast session set up mechanism provided according to embodiments of the present invention, subsequent alterations to the session configuration can be negotiated using conventional H.245 procedures. A reason for performing such alterations is to overcome any limitations inherent in the use of profiles that do not afford full expression of capabilities available using the terminals or session characteristics that are desired.

As an example, the subsequent alterations could be to add or remove additional channels, or to make modifications or replacements to the channels created through the fast session set up mechanism. Additional examples of an alteration would be an adjustment to bit rate or codec capabilities expressed through a TerminalCapabilitySet. Furthermore, modification to decoder information, such as sending an OpenLogicalChannel with decoder information, specifically decoderConfigurationInformation, to open a new channel, or to add a more optimal multiplexer table entry. An example of a session characteristic requiring alteration might be the case where a device requires symmetric codecs, but the rules used or information exchanged do not allow for this expression. In this case, a resolution could be to ignore the incorrectly asymmetric codec's data and re-open the channel based on the required symmetrical requirements.

Another technique useful for symmetric codecs and other session characteristic control is to delay message transmission, request, response or media until after certain characteristics of the receiving terminal are known. An example is that until the remote terminal characteristics are known (e.g., codec transmission selection, capabilities, and the like) a device may withhold some of its own message transmissions, request, response or media. Accordingly, the session configuration is improved by using this technique.

In general, techniques provided according to embodiments of the present invention provide session modifications that complement logical channel numbers and multiplexer table entries that are already used by the session set up process. The relationship between the logical channel number or multiplexer table entry, TerminalCapability entry, or some other aspect, and the corresponding entry in the altering message could also be used to decide if an action is to be considered as an alteration/modification or an addition. For instance, an Open Logical Channel for a channel already considered open through the use of fast session set up techniques may be considered an alteration of the established session. An Open Logical Channel on a new channel may be considered a request to open a new channel. One of ordinary skill in the art would recognize many variations, modifications, and alternatives.

Acceptance of an AnswerFast3 request by the called terminal results in a predetermined status of master slave determination by comparing the terminal type value in the received AnswerFast3 request with the value for the local terminal. The highest value will be selected as the master. In the event of equal terminal type values, the calling terminal will be selected as the master. Other variants are available, such as the transmission of an additional random number, in a similar fashion to Master Slave determination, may be used to reduce the likelihood of this resolution being decided on the caller/ callee status. It is also possible that in some cases, an inability to resolve this status in a symmetrical way would be a sufficient condition to revert to another set up technique.

Figure 5:
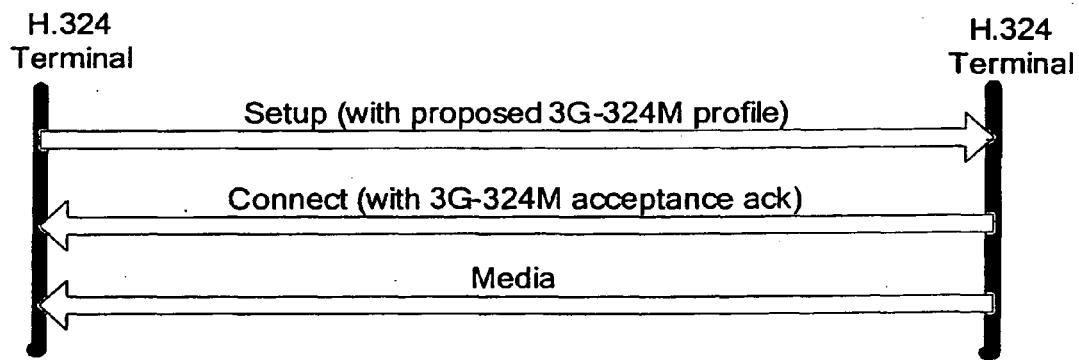
FIG. 5 is a simplified diagram illustrating the use of AnswerFast3 in Q.931 SETUP between two H.324 terminals according to an embodiment of the present invention.

FIG. 5 is a simplified diagram illustrating the use of AnswerFast3 in Q.931 SETUP between two H.324 terminals according to an embodiment of the present invention. In general, the media may be a unidirectional or bidirectional channel.

As illustrated in FIG. 5, a calling terminal requests AnswerFast3 by including a request PDU in the Q.931 SETUP message (e.g., the Subaddress field Information Element). In an embodiment, the message is populated with a PER encoded structure with the following ASN definition:

```
AnswerFast3Request ::= SEQUENCE
{
    version            INTEGER (1..255),
    terminalType       INTEGER (0..255), -- For
MasterSlaveDetermination
        initialMobileLevel      INTEGER (0..7), -- [4,7] are
reserved
        h223Extension      CHOICE
        {
            h223AnnexADoubleFlag    BOOLEAN,
            h223AnnexBOptionalHeader BOOLEAN,
            ...
        }
        audioProfiles      SEQUENCE (1..65535) OF INTEGER
(0..65535),
        videoProfiles      SEQUENCE (1..65535) OF INTEGER
(0..65535),
        multiplexProfiles          SEQUENCE (1..65535) OF
INTEGER (0..65535),
    mediaWaitForConnect BOOLEAN,
    ...
}
```

As will be evident to one of skill in the art, in embodiments in accordance with 3GPP TS 24.008, the overall length of the AnswerFast3 Request PDU cannot exceed the Q.931 prescribed Information Element length.

A called terminal responds to an AnswerFast3 Request by including a response PDU in one of the allowed Q.931 response messages to establish a session on the underlying network. For example in 3GPP, the response message could be the Alerting, Call Proceeding, or Connect message depending on the type of called terminal and whether gateways are used in the core network. The called terminal can easily check for the presence of the AnswerFast3 Response message in each response message it receives. Embedding the AnswerFast3 Response message in an early message such as the Alerting or Call Proceeding could allow the calling terminal to use the time until a Connect message is received for house-keeping purposes.

In an embodiment, the AnswerFast3 Response message is an ASN.1 PER encoded structure with the following definition:

```
AnswerFast3Response ::= SEQUENCE
{
    version INTEGER (1..255),
    terminalType INTEGER (0..255), --
MasterSlaveDetermination result
                            --  based on "terminalType"
comparison.
                            -- If terminalType is the same then
    caller
                            -- is always the master
```

-continued

```
    audioProfile INTEGER (0..65535),
    videoProfile INTEGER (0..65535),
    multiplexProfile INTEGER (0..65535),
    ...
}
```

As will be evident to one of skill in the art, in embodiments in accordance with 3GPP TS 24.008, the overall length of the AnswerFast3 Request PDU cannot exceed the Q.931 prescribed Information Element length.

If a calling terminal does not receive a session profile acknowledge in the CONNECT message, it may assume that the called terminal does not support AnswerFast3, or has not accepted any of the specified profiles. In this case, the calling terminal will proceed with the connection as if AnswerFast3 is not used. Thus, an AnswerFast3 fallback mode is provided by embodiments of the present invention. The calling terminal can also attempt to use AnswerFast2 as discussed more fully above. The calling terminal can also attempt to use AnswerFast4 as discussed more fully below.

AnswerFast4

AnswerFast4 is a method for speeding up the call set up by communicating the preferred session profiles, including those described in AnswerFast3 above, on the bearer channel instead of the signaling channel. The session profiles or preferences are messages similar to those described above, and can be further encoded for noise immunity purposes using error control techniques to improve error resiliency. The proposed session profile information is transmitted on the bearer channel as soon as it is established, and is repeated at some rate until AnswerFast4 fallback phase begins. We call the preferences message transmitted by the calling terminal (entity that originated the call) the Caller AF4 Request and the message transmitted by the called party terminal the Answerer AF4 Request. The AF4 messages are selected in a way that non AF4 supporting terminals will ignore the messages as unknown noise, corruption, or unwanted data. The called party message also contains preferences. Once the called party terminal detects the Caller AF4 Request, it analyses the request and may transmit an Answerer AF4 Response.

It should be noted that the term AF4 Response message as used in this specification is an optional message, and such a message is not necessary to the operation of AF4, but is provided for flexibility, for example, for H.324 terminals that need acknowledgement for instance of the selected mode of operation. An example may be a gateway with H.324 termination. Gateways typically need to allocate resources for transcoding, and changing the transcoding resources may be costly in complexity and processing time. In this case, the AF4 Response message may alleviate the complexity, although at the cost of slightly increased session set up time compared to the case where an AF4 Response is not used. Another example of the tradeoff of flexibility versus efficiency of set up time, is the simplification of the session profiles or preferences, in that one can elect for an approach where flexibility is not paramount but set up time is, and one can opt in this case to the simplest mechanism to signal preferences, which would include the use of predetermined profiles, and their combination as messages with media and mobile level sequences in order to achieve fast session set up, fastest fallback, but not necessarily the most flexible in terms of ability to transmit custom profiles or data. The AF4 concept described in this specification covers the principle of transmitting a "signal" early on the bearer, and independently of the H.245 messaging, and how the "signal" is exploited by the peer terminal as an indication of supporting similar acceleration technique, and provide the means to exchange media with minimal signaling. The description in the present specification covers embodiments that include the optional AF4 Response for completeness.

Figure 6A:
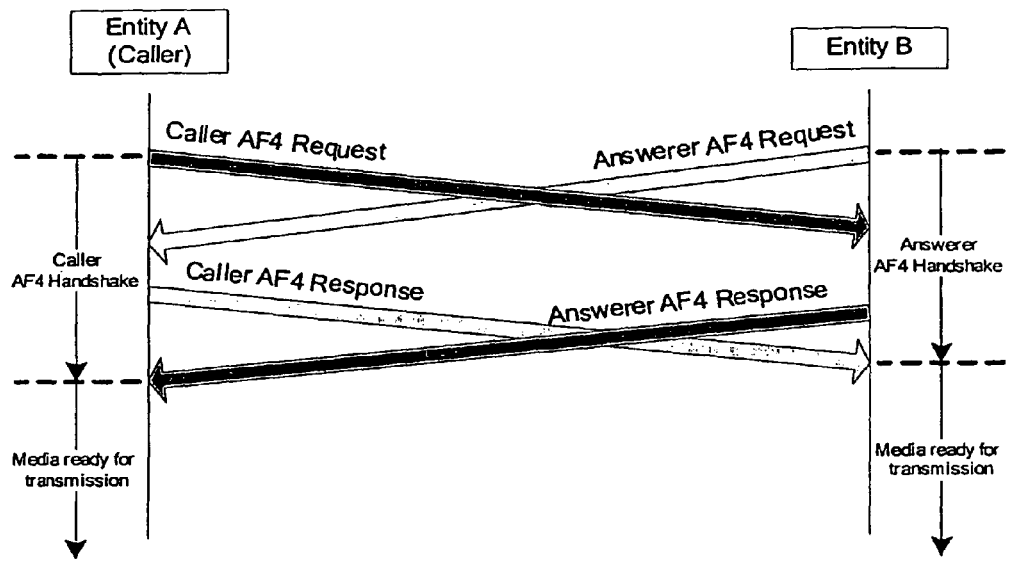
FIG. 6A is a simplified diagram illustrating the use of AnswerFast4 according to an embodiment of the present invention.

FIG. 6A is a simplified diagram illustrating AnswerFast4 according to an embodiment of the present invention. For AnswerFast4, the session profiles are similar to that described in the AnswerFast3 section. Alternatively, the session profiles can be explicitly expressed (instead of being predefined). The AnswerFast4 Request message can be constructed according to the procedure described below.

Figure 6B:
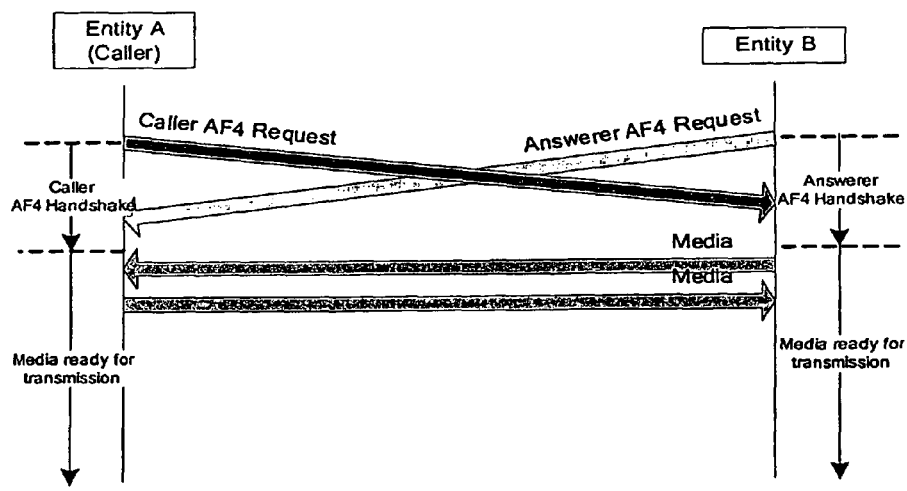
FIG. 6B is a simplified diagram illustrating the use of AnswerFast4 according to another embodiment of the present invention.

FIG. 6B is a simplified diagram illustrating AnswerFast4 according to another embodiment of the present invention. In this case, inference or a preference rule set is used at each terminal and the optional response message is not required to be sent before media transmission may begin.

AnswerFast4 Frames & Synchronization Flags

Figure 7:
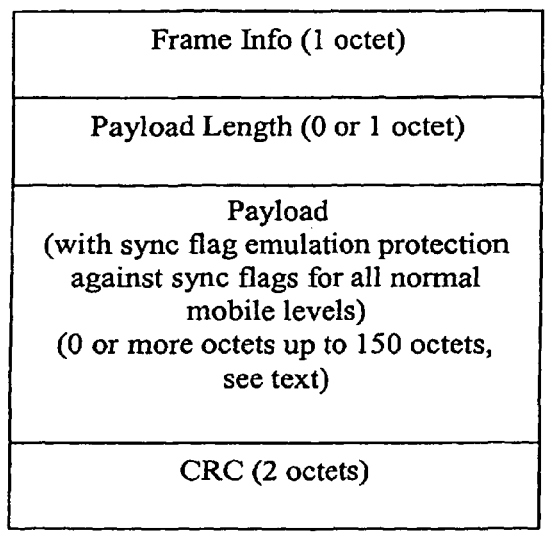
FIG. 7 is a simplified illustration of the structure of an AnswerFast4 frame according to an embodiment of the present invention.

FIG. 7 is a simplified illustration of the structure of an AnswerFast4 frame according to an embodiment of the present invention. As illustrated in FIG. 7, the AnswerFast4 request and response frames are octet aligned. Accordingly, AnswerFast4 message transmissions are octet aligned, allowing for compatibility with conventional transmissions of other mobile levels.

According to an embodiment, the Frame Info field of the AnswerFast4 frame has the values shown in Table 1:

TABLE 1

| Frame Info | Description |
| --- | --- |
| 0x00 | Request Frame |
| 0x01 | Response Frame |
| 0x02 ... 0x7F | Reserved |
| MSB of Frame Info | 1 -> Payload length present & Payload length >=1. 0 -> Payload length is not present. No payload |

The payload length field indicates the payload size before applying emulation insertion octets. The messages can be optimized for size by use of a payload present indicator, that if not present would leave the message at a minimum size. If payload were present, a payload present indicator, a payload length and a payload would all be included in the message.

In general, the payload can be of any length. In some applications, the frame information is configured to limit the payload to 150 octets, as in many networks, frames are transmitted and processed in 160 octets time-slots. Depending on the network configuration, the payload length will be varied as appropriate to the particular applications.

The messages can also be used for differing purposes depending on certain values in a header field. Different message types, such as Request, Response or Command and Indication, or media could be indicated. Also, sequence numbers or segment indicators could also be used for error resiliency and protocol use.

Referring once again to FIG. 7, the CRC field is 16 bits in length and is determined by applying a Cyclic Redundancy Check (CRC) to the entire frame excluding the AnswerFast4 Sync Flags. In an embodiment, the CRC is as described in accordance with 8.1.1.6.1/V.42. On detecting CRC error, the frame will be discarded.

Error detection or error correction can be added to AnswerFast4 messages if desired. Error correction could be used with a Forward Error Correction code similar to those already used in H.324 for higher multiplexer levels and a modification to the message allowing transmission of the required information. Error detection could be implemented using a cyclic redundancy check. The CRC value could be transmitted in the message in a specified field.

Multiplexer synchronization flag emulation protection may be performed on AnswerFast frames to ensure the entire message appears as noise and/or unwanted data on the bearer. This ensures that any transmissions are not misinterpreted by legacy devices as conventional transmissions such as level detect. It also affords the ability to invisibly transmit AnswerFast4 messages during a session through another legacy device, such as a gateway, that may be capable of intercepting legacy transmissions.

Before sending the frame to the bearer, an emulation insertion procedure is performed. The fields with Payload Length, Payload, and CRC are applied with an emulation insertion procedure. In an embodiment, all octets with values 0xA3, 0x35, 0xE1, 0x4D, 0x19, 0xB1 and 0x7E are duplicated by 1 octet with the same value.

Once both terminals detect an AnswerFast4 Request message, they will determine the media or media modes. When an AF4 Response message is in use, and when a terminal can successfully determine the media mode according to the media preference, AnswerFast4 Response can be sent. Again, the AF4 Response message is optional, and can be used as a confirmation in some situations, for example, if a terminal such as a gateway prefers to confirm the media codec selections prior to proceeding with a session. Another situation in which a Response is used is if the AnswerFast4 Request contains some application specific information request, for example, an encryption key.

There are many ways that a media mode can be determined according to the preferences and capabilities expressed from each device. If preferences resemble H.245 preferences (e.g. expressed by TCS, OLCs, and the like) codecs may be selected in the same way as normal H.245 message exchanges except that transactions are conducted implicitly till the final outcome. This technique forms an Inferred Common Mode (ICM) and it may be deduced according to capability preferences and media mode conflict resolution as specified in B.2.2.2 and C.4.1.3 in H.245.

Many other restrictions and rules sets for determining media mode are also possible, and some may be made over fewer variable characteristics. If profiles are used, then a simple matching of capabilities in preferred order could be conducted. For example if audio profiles 0x0000, 0x0100, 0x1000 are supported by a device, and it receives indication that a peer device supports only 0x01000, then 0x0100 would be selected. For the case where more than one profile capabilities are common to the devices, a preference selection will be made. An example of a preference rule would be to assign preference to the order in which the profiles are expressed. This preference order could be forward or reverse, and could be modified by other inputs. Another rule could be to select a preference based on index, either highest or lowest. For example if audio profiles 0x0000, 0x0100, 0x1000 are supported by a device, and it receives indication that a peer device supports 0x0000 and 0x01000, then 0x0100 could be selected by a rule using a highest index rule. One of ordinary skill in the art would recognize many variations, modifications, and alternatives.

Once a terminal detects an AnswerFast4 Request message, it can determine configurations (media/data/multiplexer modes) for both itself and the remote device according to the preferences received and the preferences it will transmit or has transmitted. The determination of configuration can be made from the input/presence of the AnswerFast4 message and a set of predefined rules. These rules may be predefined or predetermined based on some input, or may be simple rules based on explicit messages. Rules may, or may not, re-use rules that already exist in a device presently, such as H.245 most preferred mode.

The AnswerFast4 Sync Flag is defined as illustrated in Table 2.

TABLE 2

| 0xA3 | 1010 0011 |
|------|-----------|
| 0x35 | 0011 0101 |

An AnswerFast4 synchronization flag may be selected to ensure that it is not interpreted as a conventional message, but instead appears as noise/ignorable data to a conventional terminal. In an embodiment, one AnswerFast4 Synchronisation Flag is inserted immediately before and after each AnswerFast4 Frame. Generally, only one AnswerFast4 Synchronisation Flag will exist in between two consecutive AnswerFast4 Frames.

Embodiments of the present invention provide a procedure for constructing AnswerFast4 Requests and Responses. Once the bearer is established, if a terminal supports AnswerFast4, it will preferably immediately send an AnswerFast4 Request frame. In an embodiment, the frame may be repeated until one of the following situations occurs:

An AnswerFast4 Request frame is detected;
A valid mobile level stuffing flag is detected, as described in C.6/H.324; or
A time out occurs, and no valid AnswerFast4 Request has been detected.

When valid mobile level stuffing flags are detected, normal H.324 session procedure will be used according to Annex C/H.324. When an AnswerFast4 Request is detected, the payload is processed according to the AnswerFast4 Payload Handling procedure described in more detail below.

If the payload is interpreted successfully, the terminal accepts it by sending an AnswerFast4 Response frame if this option is used. Note that the AnswerFast4 Response itself does not require payload data. The frame is repeated, except the payload field which may contain media data if media data tunneling is desired (alternatively media could have been transmitted based on a predetermined modes if flexibility is not paramount), until one of the following situations occurs:

An AnswerFast4 Response (if in use) is detected; or
A valid mobile level stuffing flag is detected, as described in C.6/H.324.

During transmission of the AnswerFast4 Response, media may be transmitted in the payload field of the AnswerFast4 Response frame if responses and media tunneling are in use. As an example, the payload content may contain a MUX-PDU, which is in accordance with the specification of H.223, using the finally agreed mobile level. In general, the payload length will not be more than 150 octets. According to embodiments of the present invention, all terminals supporting AnswerFast4 will support and handle MUX-PDUs if included in the AnswerFast4 messages.

An AnswerFast message, for example, AnswerFast4 messages in particular, may contain media as their payload. This media may take the form of a MUX-PDU at a given multiplexer level, but it may be a specific other coding, such as the native codec bit stream form in an AnswerFast message, to take advantage of other attributes that coding may posses. If media is sent in an AnswerFast message, then it is not necessary to redundantly transmit the message, and instead a train of messages containing media can be sent that represent the audio/visual/data of the session. Alternatively, the media may simply be transmitted in appropriate MUX-PDUs on the bearer (without tunneling in AF4 messages).

Figure 8:
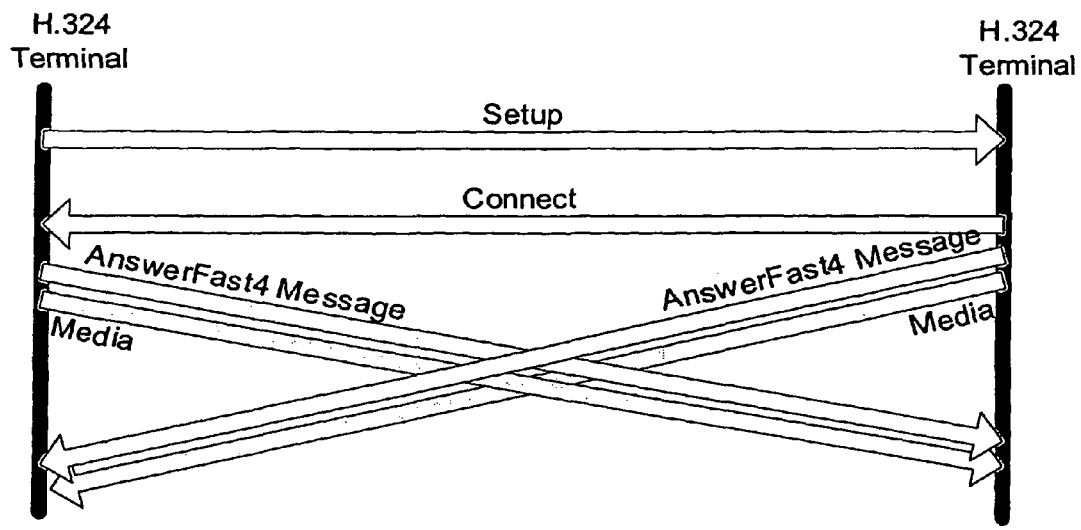
FIG. 8 is a simplified diagram illustrating a method of AnswerFast4 according to an embodiment of the present invention with media transmitted in AnswerFast4 frames.

FIG. 8 is a simplified diagram illustrating a method of AnswerFast4 according to an embodiment of the present invention with media transmitted in AnswerFast4 frames.

After sending an AnswerFast4 Request and optionally detecting an AnswerFast4 Response, the terminal will begin a normal session using the agreed mobile level. Audio and video exchange will also start immediately if they have not been started during the AnswerFast4 Response stage if in use. Utilizing embodiments of the present invention, audio and video exchange are enabled to continue seamlessly if they have been started during the AnswerFast4 Response stage whether used or not.

If acceptable media is sent as part of an AnswerFast4 message, then a seamless continuance of that media is preferable through any session configuration modifications. As configurations are accepted, or even in some cases where some aspects of a session require fallback to a different technology (e.g., AnswerFast2 or even conventional operation) seamless continuance of the media is needed to provide the best user experience. An example of seamless media join would be where a particular framing is chosen in the AnswerFast media messages. Then, upon establishment of the session, the configuration is known to be of a different particular type, e.g. at a particular multiplexer level. The receiver is therefore capable of extracting the media from both types of streams/framings and rendering them to the user (or transmitting them to a remote endpoint in the case of a gateway).

If after receiving an AnswerFast4 Request, the terminal decides not to proceed with AnswerFast4 procedure, the terminal will immediately continue normal H.324 session procedure according to Annex C/H.324 as described in more detail below. Audio and video coding will be restarted if they have been started during sending AnswerFast4 Response frames.

If some, or all, aspects of an AnswerFast4 session are not successful, then a fallback to AnswerFast2 technology is recommended. If a configuration mismatch suggests a correction, then AnswerFast2 techniques can be used to determine the correct mode and, if necessary, restart the codecs and logical channels in the fashion expected by the remote device. If AnswerFast2 (optionally with AnswerFast1 and/or some SRP extensions) does not succeed, conventional behavior should be adopted. One of ordinary skill in the art would recognize many variations, modifications, and alternatives.

If after sending and receiving AnswerFast4 Requests, the calling terminal does not detect an AnswerFast4 Response if in use, but valid mobile level stuffing flags, the terminal may stop sending AnswerFast4 Response frames immediately and continue normal H.324 session procedure according to Annex C/H.324 as described in more detail below.

A fallback to conventional mobile level operation may be triggered by detection of valid normal mobile level flags. In an embodiment, a certain threshold number must be detected to provide a level associated with detection according to H.324. After this implementation dependent threshold number is detected, the terminal should preferably stop sending the AnswerFast4 messages and drop back to AnswerFast2, or conventional behavior, as it should be apparent that the terminal is communicating with a non-AnswerFast4 capable terminal.

In an embodiment, the AnswerFast4 Request payloads are ASN.1 PER encoded structure as shown below:

```
AnswerFast4Request ::= CHOICE
{
    predefinedProfile         AnswerFast3Request,
    explicitProfile
    AnswerFast4ExplicitRequest,
    ...
}
AnswerFast4ExplicitRequest    ::= SEQUENCE
{
    terminalType              INTEGER (0..255), -- For
                                                --
MasterSlaveDetermination
    initialMobileLevel        INTEGER (0..7), -- [4,7]
are reserved
    h223Extension    CHOICE
    {
        h223AnnexADoubleFlag    BOOLEAN,
        h223AnnexBOptionalHeader BOOLEAN,
        ...
    }
    terminalCapabilitySet     TerminalCapabilitySet,
    openLogicalChannels       SEQUENCE (1..65535) OF
OpenLogicalChannel,
    multiplexEntrySend        MultiplexEntrySend,
    ...
}
```

This structure allows a terminal to use either predefined session profiles, such as those described for AnswerFast3, or to use explicit session profile definitions. Note that if flexibility is not paramount, then predetermined modes can be used and the AF4 messages can be reduced to a minimal signal that is exploited by terminals to transmit their media as early as possible, in approximately one half a round trip time.

The AnswerFast4 payload handling procedure is that the calling party is always the Master when the terminal types are identical between the two terminals and explicit Master Slave Determination knowledge is required. Alternatively the terminals may ignore the need for knowledge of master-slave relationship until later on in the session (e.g., in AF2 if used or in conventional H.245 messaging). Thus, the calling party will be in a position to accept media according to the form of the media mode signaling approach and the desired flexibility. A terminal supporting an AnswerFast technology may be required to be ready to accept (receive and decode) media immediately, depending on the form of the signaling of the session preferences whether predetermined, predefined, or explicit.

For AnswerFast3, as media will be transmitted in a known configuration immediately upon establishment of the bearer, the receiver will preferably be ready to accept and decode the media at the earliest possible time, which is equal to 0.5 round trips. In other embodiments, session establishment is performed in approximately 0.5 round trips. For AnswerFast4, with media transmitted in the payload, the media may arrive simultaneously, or in parallel, with the message indicating the preferences to be used. In this case, the receiving terminal will use the information indicating the configuration and decode/use the media.

According to embodiments of the present invention, it is possible that the information indicating the configuration may arrive or be processed too slowly to make the best use of the arriving media, or initial media is clipped by the establishment of the end to end bearer. One of several approaches to the situation involving configuration messages is to buffer all media that has arrived until the message arrives. The buffered information is used, thereby losing a minimal amount of session information. Another approach applicable to initial media clipping and lack of decoder information is to transmit non-temporally redundant media (e.g., key frames/intra frames) at either increased frequency, possibly exclusively, or at a known time. A further approach that will aid the decoding device is to include an indication, in the coding, that a media message contains non-temporally redundant media. On detection of this marker, a stream can be decoded from this point alone, allowing for processing savings and a reduction in complexity.

One particular time that would be particularly useful for the encoding/transmitting side to transmit non-temporally redundant media would be upon receipt of an acknowledgment (implicit or explicit) from the receiver at the transmitter. This follows from the fact that upon receipt of an acknowledgment, the transmitter knows the receiver is ready to decode. Other possibilities would also include the case of not receiving a negative acknowledgement in a certain time period. A particular example of this case would be the receipt of the TCS Ack in the AnswerFast2 case, or on the receipt of either an AnswerFast4 response message or AnswerFast4 session media in the AnswerFast4 case. These media arrival behaviors may be predetermined (if flexibility is not paramount), predefined, or could be explicitly signaled depending on a devices support. It should be noted that if the terminals do not recognize the messages or cannot detect them (e.g., because of corruption) then they may proceed according to AnswerFast2 speed-up techniques previously described throughout the present specification.

Embodiments of the present invention also provide for techniques to fallback from AnswerFast4. For example, if a calling terminal does not receive an AnswerFast4 message, but a normal H.245 TerminalCapabilitySet message (with or without an AF2 style message), the terminal will assume that the called terminal does not support AnswerFast4, or has not accepted any of the specified profiles. In this case, the calling terminal will continue to use the conventional TerminalCapabilitySet, MasterSlaveDetermination, MultiplexEntrySend, and OpenLogicalChannel procedures to create the session. It can also attempt to use AnswerFast2 techniques utilizing H.245 commands as described more fully throughout the present specification.

The fallback to conventional operation may be triggered by detection of a normal TCS that lacks indication of AnswerFast technique support. Upon detecting this TCS, a terminal should preferably stop sending AnswerFast4 messages and drop back to AnswerFast2 or conventional behavior as it should be apparent that the terminal is communicating with a legacy device.

Embodiments of the present invention provide techniques that combine interleaving of fast session establishment signaling or messaging with conventional techniques and media. As described more fully in co-pending and commonly assigned U.S. patent application Ser. No. 10/934,077, titled "Methods and Systems for Fast Session Establishment Between Equipment Using H.324 and Related Telecommunications Protocol," filed Sep. 4, 2004, incorporated herein by reference in its entirety for all purposes, a further embodiment of the AnswerFast4 technique involves a combination of conventional multiplexer level set up and AnswerFast4. One possible combination of techniques is with AnswerFast4 messages being transmitted onto the bearer less densely than the maximum possible (e.g., not back to back). This sparseness of transmission leaves the bearer unused by the AnswerFast technique at points in time. When not in use, the bearer is available to the device to use in a conventional fashion. Typically, immediately upon bearer establishment, mobile level detection/set up is conducted, so in a particular embodiment, the bearer time gaps that mobile level stuffing flags would be transmitted. Such methods may be combined or used with conventional techniques depending upon the embodiment. One of ordinary skill in the art would recognize many variations, alternatives, and modifications.

Since the AnswerFast device is operating partially in a conventional manner, interleaving in this manner will minimize any delay when interoperating with another conventional device. The sparseness of AnswerFast4 message retransmission is a parameter that can be tuned based on required error resilience and conventional interoperation delay desired. Adaptation of the AnswerFast4 messages is also possible based on input from the conventional operations. For example, detection of a particular mobile level through conventional means, even in an AnswerFast4 to AnswerFast4 negotiation, may be used to determine the form of media transmissions.

For an H.324 entity which supports all AnswerFast methods, embodiments of the present invention provide methods and system to support fallback procedures when the called H.324 entity does not support one or more of the AnswerFast methods. For example, if a calling terminal begins a call using AnswerFast3, and the called terminal does not support AnswerFast3, the calling terminal will fallback using the following procedures:

AnswerFast4

AnswerFast2

Normal H.245 communication as in Phase D of the terminal procedures specified in 7.4.

The fallback procedure of AnswerFast3 has been described previously.

If a calling terminal begins or continues a call using AnswerFast4, and the called terminal does not support AnswerFast4, the calling terminal will fallback using the following procedures:

AnswerFast2

Normal H.245 communication as in Phase D of the terminal procedures specified in 7.4.

The fallback procedure of AnswerFast4 has been described previously.

If a calling terminal begins or continues a call using AnswerFast2, and the called terminal does not support AnswerFast2, the calling terminal will fallback using the following procedure:

Normal H.245 communication as in Phase D of the terminal procedures specified in 7.4.

The fallback procedure of AnswerFast2 has been described previously.

According to embodiments of the present invention, terminal configurations are utilized to take advantage of the benefits provided by AnswerFast technologies. As an example, embodiments of the present invention utilize SRP extensions (i.e., frame parallel transmission) to provide several benefits. The SRP extension techniques, more fully described in co-pending and commonly assigned U.S. Patent Application No. 60/433,252, titled "Optimization of H.324 < > H.323 Session Establishment in Multimedia Gateways," filed Dec. 12, 2002, and incorporated herein by reference in its entirety for all purposes, could be used in conjunction with the H.245 techniques described herein with respect to AnswerFast1 and AnswerFast2. These techniques will provide benefits including, but not limited to, session resilience, transmission efficiency, and any associated increase in set up performance.

The 3G modem may also contribute to significant increases in the call set up time. Therefore, the operation and interaction of the modem with the call set up phase is an area of interest. Merely by way of example, areas in which potential optimization is available include:

1. Modem initialization,
2. Time required from bearer CONNECT signal to bearer channel availability, and
3. Resources required for modem operation.

It is generally expected that the receiver and transmitter sides may be in separate threads. In either case, the thread priority should preferably be set to as high as possible to maintain continuous data flow at the communication bearer.

Embodiments of the present invention minimize the time to ready media processors, which is potentially noticeable, by initializing media input/output (e.g., audio and video) as soon as possible. In a particular embodiment, the optimal time is when a call is going to be made. From the perspective of a caller, this refers to the time when the call button is pressed. From the perspective of an answerer, this refers to the time when the RING tone is detected. Media processors, including audio and video media processors, are provided, one for frame capturing and encoding, and one for decoding and playback.

In a specific embodiment, in order to provide optimal call set up performance, all supported encoders and decoders are made available and ready before the start of AnswerFast procedures. This process is referred to as codec initialization and is applicable to both audio and video. This embodiment has less relevance to system performance when the initialization time is negligible. Of note, for embedded systems, encoders and decoders can be instantiated as soon as the inferred common mode is available, thus allowing time to ready the encoders and decoders as quickly as possible after that event.

Embodiments of the present invention provide for session preparation, in which media devices are initialized and placed in a ready state before the bearer is established. For some applications, optimization may need to be performed to achieve the desired session preparation. These media devices include:

1. Video capture/camera, including self-view if applicable and associated codecs,
2. Video display and associated codecs,
3. Audio capture/microphone and associated codecs, and
4. Audio playback and associated codecs.

As the techniques presented here are forward compatible with new device capabilities, it would be advantageous to be able to update capabilities and preferences of the device for fast session set up whenever other modifications are made. It is therefore highly desirable that the AnswerFast user entity, as well as the AnswerFast rules and profiles are designed and implemented in a way that allows for simple update to released devices. Merely by way of example, in an embodiment, over the air updates are provided. These over the air updates may be provided either in a combined update or distributed over several updates. When combined, an update of a capability (e.g., a codec) may be coupled with any updates in device preferences, as well as any upgraded rules required for using that capability. One of ordinary skill in the art would recognize many variations, modifications, and alternatives.

The AnswerFast messaging system has a range of flexibility both in application and implementation. The information transmission and any rules can cover any configurations desired, and the fully configurable session can be set up in significantly faster time than is available through conventional set up procedures. It is possible to reduce the complexity of rules and implementations by placing certain limitations on the kinds of flexibility available. Primitive versions of the AnswerFast transmissions could be used that are less configurable and flexible, but still yield many advantages.

The advantages may be leveraged best in a setting were many homogenous devices, or devices with homogenous characteristics (e.g., the same codecs) are interoperating. In this setting, several assumptions may be made about the expected decisions of the remote device, and in the majority of cases, these assumptions would be confirmed correct. This can give a statistical gain in the performance of the devices, as the number of times an assumption is confirmed would far outweigh the times it is incorrect, which would typically result in a corrective negotiation.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A multimedia device configured to support video in a session of a call, the multimedia device comprising:
   one or more media providing devices;
   one or more computer codes directed to performing an initialization process for the one or more media providing devices, the initialization process being performed at an initialization time prior to or substantially equal to:
      if the multimedia device initiates the call, a first time prior to or substantially equal to a reception time associated with receiving an indication of call acceptance from a called device; or
      if the multimedia device receives the call, a second time prior to or substantially equal to an acceptance time associated with call acceptance by the multimedia device;
   one or more computer codes directed to transmitting one or more preferences for the session according to a session setup procedure;
   one or more media processors coupled to the one or more media providing devices; and
   one or more computer codes directed to transmitting media on one or more media channels associated with the session.

2. The multimedia device of claim 1 wherein the multimedia device initiates the call and the first time is substantially equal to a time of call initiation.

3. The multimedia device of claim 1 wherein the multimedia device receives the call.

4. The multimedia device of claim 1 wherein the one or more media providing devices comprise two media capture devices including an audio capture device and a video capture device.

5. The multimedia device of claim 1 wherein the one or more media processors comprise one or more media encoders.

6. The multimedia device of claim 5 wherein the one or more media encoders are initialized prior to or substantially equal to a time associated with establishing a bearer for the call.

7. The multimedia device of claim 5 further comprising:
   one or more media output devices; and
   one or more media decoders coupled to the one or more media output devices.

8. The multimedia device of claim 1 wherein the initialization time is prior to a time of establishing a bearer for the call.

9. The multimedia device of claim 1 wherein transmitting media on one or more media channels utilizes a frame flag emulation avoidance technique.

10. A multimedia device configured to support video in a session of a call, the multimedia device comprising:
    one or more media providing devices;
    one or more media processors coupled to the one or more media providing devices;
    one or more computer codes directed to initializing the one or more media processors, the initializing occurring at an initialization time prior to or substantially equal to:
       if the multimedia device initiates the call, a first time prior to or substantially equal to a reception time associated with receiving an indication of call acceptance from a called device; or
       if the multimedia device receives the call, a second time prior to or substantially equal to an acceptance time associated with call acceptance by the multimedia device;
    one or more computer codes directed to transmitting one or more preferences for the session according to a session setup procedure; and
    one or more computer codes directed to transmitting media on one or more media channels associated with the session.

11. A multimedia device configured to support video in a session of a call, the multimedia device comprising:
    one or more media output devices;
    one or more media processors coupled to the one or more media output devices;
    one or more computer codes directed to initializing the one or more media processors, the initializing occurring at an initialization time prior to or substantially equal to:
       if the multimedia device initiates the call, a first time prior to or substantially equal to a reception time associated with receiving an indication of call acceptance from a called device; or
       if the multimedia device receives the call, a second time prior to or substantially equal to an acceptance time associated with call acceptance by the multimedia device;
    one or more computer codes directed to transmitting one or more preferences for the session according to a session setup procedure; and
    one or more computer codes directed to receiving media on one or more media channels associated with the session.

12. The multimedia device of claim 11 wherein the one or more media processors are one or more media decoders.

13. The multimedia device of claim 11 wherein the multimedia device initiates the call wherein the first time is substantially equal to a time of call initiation.

14. The multimedia device of claim 11 wherein the multimedia device receives the call.

15. A multimedia infrastructure device configured to support video in a session of a call, the multimedia infrastructure device comprising:
    one or more media reception ports;
    one or more media processors coupled to the one or more media reception ports;
    one or more computer codes directed to initializing the one or more media processors, the initializing occurring at an initialization time prior to or substantially equal to:
       if the multimedia infrastructure device initiates an outgoing call, a first time prior to or substantially equal to a reception time associated with receiving an indication of call acceptance from a called device; or
       if the multimedia infrastructure device receives an incoming call, a second time prior to or substantially equal to an acceptance time associated with call acceptance by the multimedia infrastructure device;

one or more computer codes directed to transmitting one or more preferences for the session according to a session setup procedure; and one or more computer codes directed to transmitting media on one or more media channels associated with the session.

16. The multimedia infrastructure device of claim 15 wherein the multimedia infrastructure device comprises a 3G-324M-like infrastructure device or a 3G-324M-like gateway.

17. The multimedia infrastructure device of claim 15 wherein the one or more media processors comprise one or more media encoders or transcoders.

18. The multimedia infrastructure device of claim 15 wherein the multimedia device initiates the call and the first time is substantially equal to a time of call initiation.

19. The multimedia infrastructure device of claim 15 wherein the multimedia infrastructure device receives the call.

20. A multimedia infrastructure device configured to support video in a session of a call, the multimedia infrastructure device comprising:
   one or more media transmission ports;
   one or more media processors coupled to the one or more media transmission ports;
   one or more computer codes directed to initializing the one or more media processors, the initializing occurring at an initialization time prior to or substantially equal to:
      if the multimedia infrastructure device initiates an outgoing call, a first time prior to or substantially equal to a reception time associated with receiving an indication of call acceptance from a called device; or
      if the multimedia infrastructure device receives an incoming call, a second time prior to or substantially equal to an acceptance time associated with call acceptance by the multimedia infrastructure device;
   one or more computer codes directed to transmitting one or more preferences for the session according to a session setup procedure; and
   one or more computer codes directed to receiving media on one or more media channels associated with the session.

21. The multimedia infrastructure device of claim 20 wherein the one or more media processors comprise one or more media decoders or one or more media encoders or transcoders.

22. The multimedia infrastructure device of claim 20 further comprising one or more computer codes directed to transmitting media on a second one or more media channels associated with the session.

23. The multimedia infrastructure device of claim 22 wherein transmitting media occurs after receiving a second one or more preferences for the session.

24. The multimedia infrastructure device of claim 20 wherein the multimedia infrastructure device initiates the outgoing call and the first time is substantially equal to a time of call initiation.

25. The multimedia infrastructure device of claim 20 wherein the multimedia infrastructure device receives the incoming call.

* * * * *